United States Patent
Daggett et al.

(10) Patent No.: US 12,492,708 B1
(45) Date of Patent: Dec. 9, 2025

(54) FAN ASSEMBLY FOR A GAS TURBINE ENGINE

(71) Applicant: General Electric Company, Evendale, OH (US)

(72) Inventors: Nicholas M. Daggett, Camden, ME (US); Christopher C. Glynn, Clearwater Beach, FL (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/822,859

(22) Filed: Sep. 3, 2024

(51) Int. Cl.
| | |
|---|---|
| F04D 29/34 | (2006.01) |
| B64C 11/34 | (2006.01) |
| F01D 5/02 | (2006.01) |
| F01D 7/00 | (2006.01) |
| F04D 29/054 | (2006.01) |
| F04D 29/32 | (2006.01) |

(52) U.S. Cl.
CPC .......... *F04D 29/34* (2013.01); *B64C 11/346* (2013.01); *F01D 5/027* (2013.01); *F01D 7/00* (2013.01); *F04D 29/054* (2013.01); *F04D 29/324* (2013.01)

(58) Field of Classification Search
CPC ... F01D 5/027; F01D 5/10; F01D 7/00; F02K 3/06; F04D 29/054; F04D 29/323; F04D 29/324; F04D 29/34–366; B64C 11/346
See application file for complete search history.

(56) References Cited

U.S. PATENT DOCUMENTS

| 2,844,303 | A | | 7/1958 | Kristiansen |
| 4,111,601 | A | | 9/1978 | Richard |
| 4,441,859 | A | | 4/1984 | Sadler |
| 4,913,623 | A | * | 4/1990 | Schilling ............... B64C 11/346 |
| | | | | 416/129 |
| 5,152,668 | A | | 10/1992 | Bulman et al. |
| 8,955,409 | B2 | * | 2/2015 | Carvalho ............. B64C 11/008 |
| | | | | 74/574.2 |
| 9,416,733 | B2 | | 8/2016 | Gallet |

(Continued)

FOREIGN PATENT DOCUMENTS

| FR | 3127269 A1 | 3/2023 |
| FR | 3130896 A1 | 6/2023 |

(Continued)

*Primary Examiner* — Sang K Kim
(74) *Attorney, Agent, or Firm* — Venable LLP; Edward A. Kmett; Michele V. Frank

(57) ABSTRACT

A fan assembly for a gas turbine engine includes a fan actuation system, a fan blade hub, a plurality of fan blades, and a counterweight system arranged disconnected from the plurality of fan blades. The counterweight system includes a counterweight hub, and a plurality of counterweight levers each having a counterweight trunnion rotationally connected to the counterweight hub, a cantilever arm with a counterweight connected thereto. The fan blades are rotationally connected to the fan blade hub and to the fan actuation system, and the counterweight levers are rotationally connected to the counterweight hub and to the fan actuation system. The fan actuation system is arranged to correspondingly rotate each of the plurality of fan blades about a respective fan blade pitch change axis, and each of the plurality of counterweight levers about a counterweight lever rotational axis in unison.

20 Claims, 11 Drawing Sheets

(56) References Cited

U.S. PATENT DOCUMENTS

| | | | |
|---|---|---|---|
| 9,869,190 B2 | 1/2018 | Niergarth et al. | |
| 10,036,262 B2 | 7/2018 | Tajan et al. | |
| 10,899,432 B2 | 1/2021 | Charier et al. | |
| 11,505,306 B2 * | 11/2022 | Niergarth | F01D 7/00 |
| 11,674,435 B2 * | 6/2023 | Daggett | F02C 3/06 |
| | | | 60/805 |
| 2018/0335047 A1 * | 11/2018 | Charier | F04D 29/323 |
| 2024/0117813 A1 | 4/2024 | Wang et al. | |
| 2024/0337195 A1 * | 10/2024 | Beljambe | F02K 3/06 |

FOREIGN PATENT DOCUMENTS

| | | | |
|---|---|---|---|
| FR | 3130897 A1 | 6/2023 | |
| FR | 3133367 A1 | 9/2023 | |
| FR | 3133368 A1 | 9/2023 | |

\* cited by examiner

FAN ASSEMBLY FOR A GAS TURBINE ENGINE

TECHNICAL FIELD

The present disclosure relates generally to a fan assembly for a gas turbine engine.

BACKGROUND

A gas turbine engine for an aircraft may include a fan assembly as a propulsion source. The fan assembly generally includes a plurality of fan blades connected to a hub that is driven by a drive shaft. Each fan blade is generally rotationally mounted to the hub about a pitch change axis of the blade so as to be capable of changing an angle of attack of the fan blade. During flight operations, the rotating of the fan blades to change the angle results in aerodynamic twisting in the fan blades, which impart a torque moment to a trunnion mounting the fan blades to the hub.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
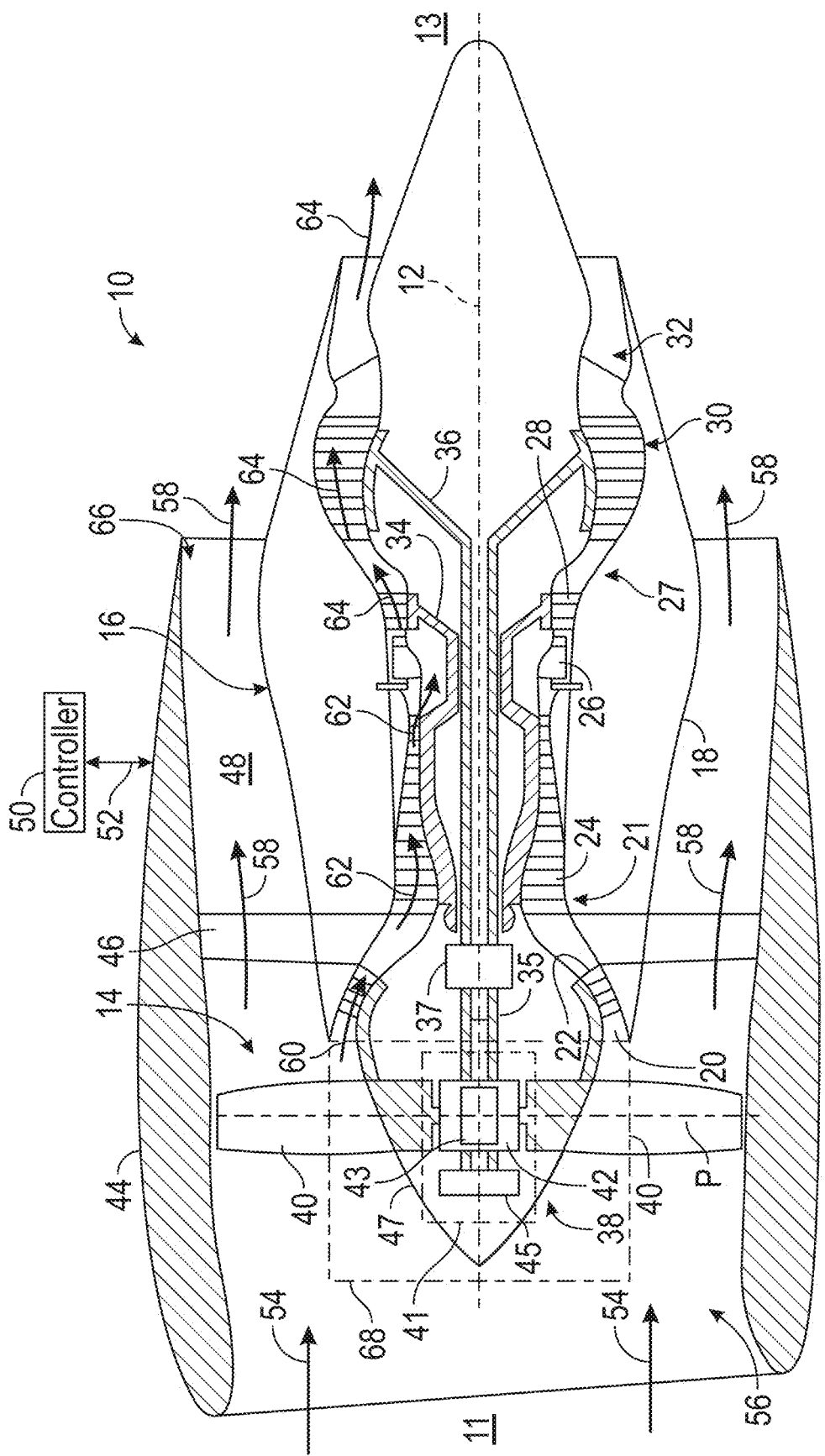
FIG. 1 is a schematic, cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," or "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or flight vehicle and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan.

As used herein, the term "radially" refers to directions and orientations that extend substantially perpendicular to a longitudinal centerline axis of the turbine engine. In addition, as used herein, the terms "circumferential" and "circumferentially" refer to directions and orientations that extend arcuately about the longitudinal centerline axis of the turbine engine.

As used herein, the terms "low," "mid" (or "mid-level"), and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-level power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbine engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

The terms "coupled," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

Conventionally, an aircraft engine (e.g., a gas turbine engine) may include a fan assembly as a propulsion source. The fan assembly may be implemented, for example, in a ducted fan gas turbine engine or in an unducted fan gas turbine engine. The fan assembly generally includes a plurality of fan blades connected to a hub that is driven by a drive shaft. Each fan blade is generally rotationally mounted to the hub so that the fan blade can be rotated about a pitch change axis of the blade in order to change an angle of attack of the fan blade. During flight operations, the rotating of the fan blades to change the angle of attack results in aerodynamic and mechanical twisting in the fan blades, which imparts a torque moment to a trunnion mounting the fan blades to the hub. The torque moment imparted to the trunnion mounting the fan blades, in turn, imparts an axial force to an actuator to which the fan blade trunnion is connected. To counteract the torque imparted to the fan blade trunnion, counterweights may be implemented as described below.

The present disclosure provides a counterweight system that is located remotely from the fan blades and includes a cantilever counterweight structure to provide a counteracting axial force to the actuator, to counter the axial force imparted by the fan blades. The counterweight system includes a counterweight hub to which a plurality of counterweight levers are rotationally connected. Each counterweight lever has a counterweight trunnion portion that is rotationally connected to the counterweight hub, and a counterweight cantilever arm having a first end connected to the counterweight trunnion and a second end opposite the first end. Counterweights are connected to the second end of the cantilever arm. A length of each cantilever arm is determined based on an inner circumference of a spinner fairing so that a maximum cantilever effect can be obtained from the counterweights. The fan blade hub, which is separate from the counterweight hub, and the plurality of levers of the counterweight system are driven axially by a common actuator shaft. That is, axial movement of the actuator shaft causes the fan blades to rotate about the fan blade pitch axis, and also causes each of the counterweight levers to rotate about a counterweight lever rotational axis. As a result, the axial force imparted into the common actuator shaft by the fan blade torque is countered by a counter axial force imparted to the common actuator shaft by the counterweight system. Providing the counterweights on the cantilever arm allows for a reduction in the amount of counterweight needed to counteract the twisting moments imparted into the fan assembly by the fan blades, as compared to engines without the benefit of the present disclosure.

Referring now to the drawings, FIG. 1 is a schematic, cross-sectional side view of an exemplary high by-pass turbofan jet engine 10, herein referred to as "engine 10," as may incorporate various embodiments of the present disclosure. Although further described below with reference to a ducted turbofan gas turbine engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type gas turbine engines such as that shown in FIG. 1, but can be implemented in unducted fan (UDF) type gas turbine engines (also known as open rotor engines). Further, the present disclosure may be implemented in propeller driven aircraft engines other than gas turbine engines (e.g., in reciprocating (piston) aircraft engines). As shown in FIG. 1, engine 10 has a longitudinal centerline axis 12 that extends therethrough from an upstream end 11 of the engine 10 to a downstream end 13 of the engine 10 for reference purposes. In general, engine 10 may include a fan section 14 and a turbo-engine 16 disposed downstream from the fan section 14.

The turbo-engine 16 may generally include an outer casing 18 that defines an annular inlet 20 to the turbo-engine 16. The outer casing 18 encases, or at least partially forms, the turbo-engine 16. The turbo-engine 16 includes, in a serial flow relationship, a compressor section 21 that includes a booster or a low-pressure compressor (LPC) 22 and a high-pressure compressor (HPC) 24, a combustor 26, a turbine section 27 that includes a high-pressure turbine (HPT) 28 and a low-pressure turbine (LPT) 30, and a jet exhaust nozzle 32. A high-pressure rotor shaft 34 drivingly connects the HPT 28 to the HPC 24. A low-pressure rotor shaft 36 drivingly connects the LPT 30 to the LPC 22. The low-pressure rotor shaft 36 may also be connected to a reduction gearbox assembly 37, such as in an indirect-drive or a geared-drive configuration. In other embodiments, although not illustrated, the engine 10 may further include an intermediate-pressure compressor and an intermediate-pressure turbine rotatable with an intermediate-pressure shaft that connects the intermediate-pressure turbine and the intermediate-pressure compressor.

For the embodiment depicted in FIG. 1, the fan section 14 includes a fan assembly 38 (e.g., a variable pitch fan) having a plurality of fan blades 40 (two are shown in FIG. 1) rotationally coupled to a fan blade hub 42 in a circumferentially spaced-apart manner. As depicted in FIG. 1, the fan blades 40 extend outwardly from the fan blade hub 42 generally along a radial direction R. Each fan blade 40 is rotatable relative to the fan blade hub 42 about a blade pitch change axis P by virtue of the fan blades 40 being operatively coupled to a fan actuation system 41 that includes an actuator 43 (described in more detail below) configured to collectively vary the pitch angle of the fan blades 40 in unison, and a counterweight system 45, which will be described in more detail below. The fan assembly 38 also includes a spinner fairing 47 that surrounds the fan actuation system 41. The fan blades 40, the fan blade hub 42, the counterweight system 45, the spinner fairing 47, and the actuator 43 are together rotatable about the longitudinal centerline axis 12 via a fan shaft 35 that is powered by the LP shaft 36 across the reduction gearbox assembly 37. The reduction gearbox assembly 37 includes a plurality of gears (not shown) for adjusting the rotational speed of the fan shaft 35 and for adjusting the rotational speed of the fan assembly 38 relative to the LP shaft 36.

In the embodiment of FIG. 1, an annular fan casing or a nacelle 44 circumferentially surrounds the fan section 14 and/or at least a portion of the turbo-engine 16. Thus, the embodiment of FIG. 1 depicts a ducted fan type gas turbine engine. In other embodiments, however, such as in an unducted fan type gas turbine engine, the nacelle 44 and associated supporting structure (described below), would be omitted. The nacelle 44 may be supported relative to the turbo-engine 16 by a plurality of circumferentially spaced outlet guide vanes or struts 46. Moreover, at least a portion of the nacelle 44 may extend over an outer portion of the turbo-engine 16 so as to define a bypass airflow passage 48 between the nacelle 44 and the outer casing 18.

An engine controller 50 communicates with various components of the engine 10 via a communication channel 52. The engine controller 50 may be a full authority digital engine controller (FADEC) that controls operation of the engine 10 via control signals transmitted to the various components of the engine 10 via the communication channel 52, and by receiving signals from the various components of the engine 10 via the communication channel 52. The engine controller 50 may be provided within the engine 10, or within a structure to which the engine 10 is mounted (e.g., an aircraft).

During a standard operating mode of the gas turbine engine 10, a volume of air 54 enters the aircraft gas turbine engine 10 through an inlet 56 of the nacelle 44 and/or the fan section 14. As the volume of air 58 passes across the fan blades 40, a first portion of air 54, shown as bypass air 58, is directed or routed into the bypass airflow passage 48, and a second portion of the air 54, shown as core air 60, is directed or is routed into the annular inlet 20 of the LPC 22. The bypass air 58 is routed through the bypass airflow passage 48 before being exhausted from a fan bypass nozzle 66 of the gas turbine engine 10, providing the main propulsive thrust for the gas turbine engine 10. A ratio between the bypass air 58 and the core air 60 is known as a bypass ratio. The core air 60 is compressed by the LPC 22, generating compressed air 62, and the compressed air 62 is routed through the HPC 24, where the compressed air 62 is further compressed before being directed into the combustor 26.

In the combustor 26, the compressed air 62 is mixed with fuel and burned to generate combustion gases 64 (also referred to as combustion products). The combustion gases 64 are routed from the combustor 26 into the HPT 28 and expanded through the HPT 28. In the HPT 28, a portion of thermal energy and/or kinetic energy from the combustion gases 64 is extracted by the HPT 28, causing the HP shaft 34 to rotate, supporting operation of the HPC 24. The combustion gases 64 are then routed into the LPT 30 and are further expanded through the LPT 30. Here, a second portion of the thermal energy and/or the kinetic energy is extracted from the combustion gases 64, causing the LP shaft 36 to rotate, supporting operation of the LPC 22 and rotation of the fan assembly 38 via the reduction gearbox assembly 37. The combustion gases 64 are subsequently routed through the jet exhaust nozzle 32 of the turbo-engine 16 to provide additional propulsive thrust.

Figure 2:
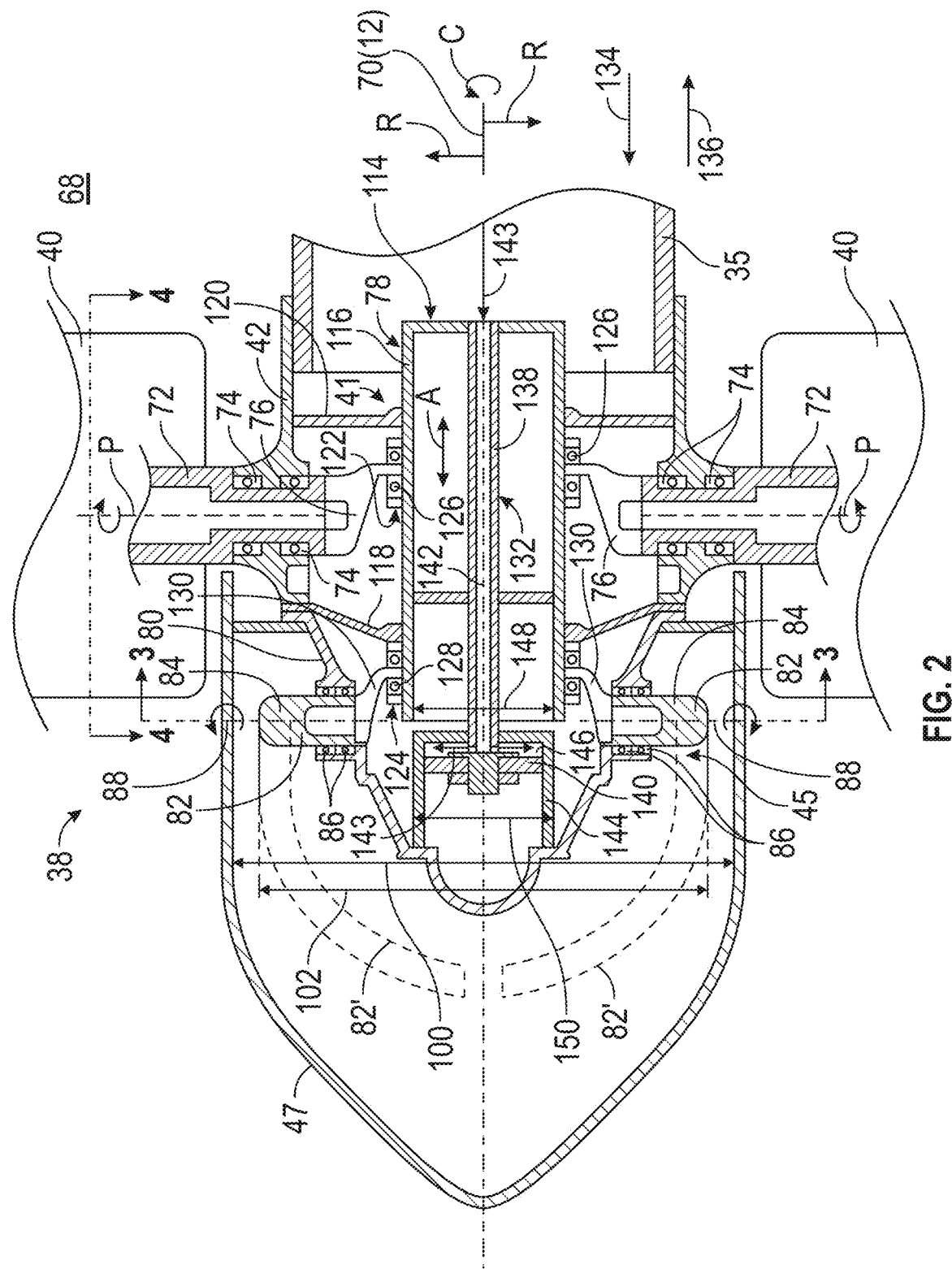
FIG. 2 is an enlarged, detailed, cross-sectional view of a fan assembly, taken at detail view 68 of FIG. 1, according to an aspect of the present disclosure.

FIG. 2 is an enlarged, detailed, cross-sectional view of the fan assembly 38, taken at detail view 68 of FIG. 1, according to an aspect of the present disclosure. As shown in FIG. 2, the fan assembly 38 defines a fan assembly centerline axis 70, which may be congruent with the longitudinal centerline axis 12 of the engine 10. The fan blade hub 42 is connected to the fan shaft 35, and the fan shaft 35 drives rotation of the fan assembly 38 about the fan assembly centerline axis 70. As was described above, the fan assembly 38 includes the plurality of fan blades 40, and the fan blades 40 are rotationally connected to the fan blade hub 42 to rotate about their respective blade pitch change axis P. For example, each of the fan blades 40 may include a fan blade trunnion 72 that is connected to the fan blade hub 42 via one or more bearing members 74, and a blade crank arm 76 is attached to the fan blade trunnion 72. As will be described below, the blade crank arm 76 is driven by a blade-counterweight actuator assembly 78 (corresponding to the actuator 43 of FIG. 1) that translates in an axial direction A to cause rotation of each fan blade trunnion 72 about their respective blade pitch change axis P so as to rotate the respective fan blade 40.

As described above, the fan assembly 38 includes the counterweight system 45 that is arranged remotely from the plurality of fan blades 40. That is, the counterweight system 45 is not connected to the fan blades 40 directly. For example, the counterweight system 45 is not connected to any part of the fan blades 40, including a trunnion connecting the fan blades to a fan hub. Similarly, the counterweight system 45 is not connected to the fan blades 40 via a linkage that may, for example, connect the fan blades 40 to a counterweight that may, for example, be attached to the fan hub. Rather, the counterweight system 45 is located apart from the fan blades 40, and is arranged to impart counteracting axial loads to an actuator that drives rotation of the fan blades 40, and that also drives rotation of the remote counterweight system 45. In FIG. 2, the counterweight system 45 includes a counterweight hub 80 that may be connected to the fan blade hub 42, such that rotation of the fan blade hub 42 about the fan assembly centerline axis 70 when the fan blade hub 42 is driven by the fan shaft 35, drives rotation of the counterweight hub 80 about the fan assembly centerline axis 70. The counterweight hub 80 has a plurality of counterweight levers 82 that are rotationally connected to the counterweight hub 80. For example, each of the counterweight levers 82 may be mounted to the counterweight hub 80 via one or more bearing members 86 that provide the ability for the counterweight lever 82 to rotate about a counterweight lever rotational axis 88.

Figure 3:
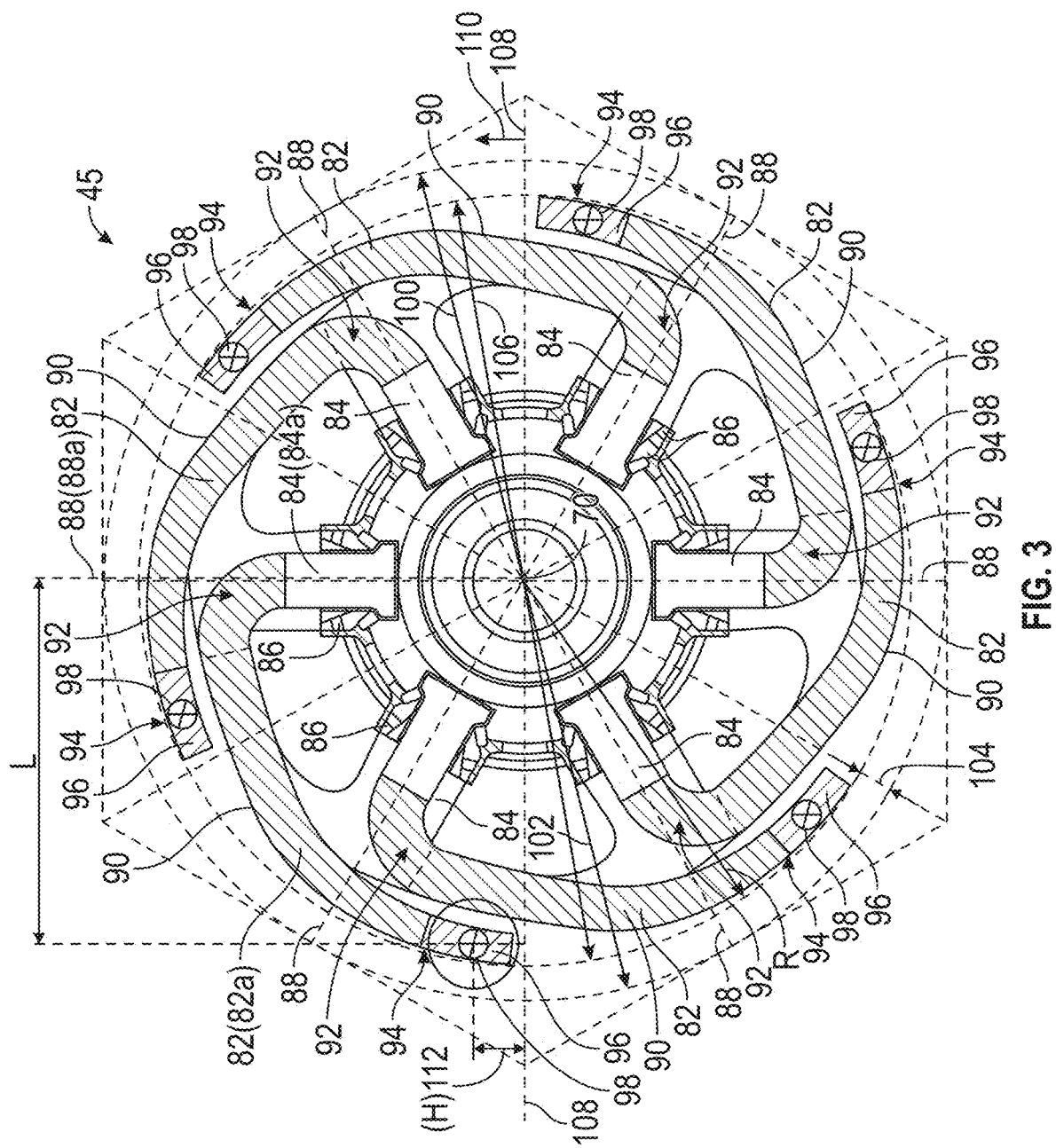
FIG. 3 is an aft-looking, cross-sectional view of a counterweight system, taken at plane 3-3 of FIG. 2, according to an aspect of the present disclosure.

FIG. 3 is an aft-looking, cross-sectional view of the counterweight system 45, taken at plane 3-3 of FIG. 2, according to an aspect of the present disclosure. As will be described in more detail below with regard to FIG. 6, the counterweight system 45 shown in FIG. 3 is for the case when the counterweight system 45 is in a retracted state. As shown in FIG. 3, the counterweight system 45 includes the plurality of counterweight levers 82, and each counterweight lever 82 includes a counterweight trunnion portion 84 that is rotationally connected to the counterweight hub 80 via the bearing members 86. The bearing members 86 may be any type of bearing (e.g., tapered roller bearings, spherical roller bearings, cylindrical roller bearings, needle roller bearings, thrust ball bearings, angular contact roller bearings, deep groove ball bearings, etc.), and are not limited to any particular type of bearing The counterweight trunnion portion 84 is rotational about the counterweight lever rotational axis 88 that extends through the counterweight trunnion portion 84 and extends radially (i.e., in a radial direction R) from the fan assembly centerline axis 70. Each counterweight lever 82 also includes a cantilever arm 90 having a first end 92 connected to the counterweight trunnion portion 84 and a second end 94 offset from the respective counterweight lever rotational axis 88. A counterweight 96 is connected to the second end 94 of the cantilever arm 90 of the counterweight lever 82. The counterweight 96 has a counterweight center-of-gravity 98 which, as will be described below, is utilized in locating the counterweight 96 within the counterweight system 45.

Referring back to FIG. 2, as well as to FIG. 3, the spinner fairing 47 has an inner circumference 100 in the area of the counterweight system 45. Each counterweight lever 82 is sized so that a radial extent 102 of each of the plurality of counterweight levers 82 from the fan assembly centerline axis 70 is defined by a circumference 106 about the fan assembly centerline axis 70, having a radial distance R extending orthogonally from the fan assembly centerline axis 70. The radial extent 102 provides a clearance 104 between the inner circumference 100 of the spinner fairing 47 and each of the plurality of counterweight levers 82. That is, the counterweight system 45 is designed so that the counterweight levers 82 fit within the confines of the spinner fairing 47, while also providing the maximum distance of the counterweight center-of-gravity 98 from the respective counterweight lever rotational axis 88. As will be described below, when the fan assembly 38 is operational (i.e., the engine 10 is running and driving the fan assembly 38 about the fan assembly centerline axis 70), the counterweight 96 imparts a moment about the counterweight lever rotational axis 88. The further a length (L) that the counterweight center-of-gravity 98 is located relative to the counterweight lever rotational axis 88, the greater the moment. In the counterweight system 45 of FIG. 3, the counterweight center-of-gravity 98 is arranged at a length (L) extending perpendicularly from the respective counterweight lever rotational axis 88, and the length (L) satisfies the relationship: $R<L>0.5*R$, where R is the radial extent 102. For example, the radial extent R may be twenty one inches (or a forty two inch diameter with respect to the fan assembly centerline axis 70), and the length L may be less than twenty one inches and greater than ten and one-half inches. To obtain a longer length (L), the counterweight lever 82 may have a curved cantilever arm 90 as shown in FIG. 3, where at least a portion of the second end 94 of each counterweight lever 82 overlaps circumferentially with a portion of the first end 92 of a circumferentially spaced apart adjacent counterweight lever 82.

In addition to the length (L) for locating the counterweight center-of-gravity 98, a height (H) range may be established for locating the counterweight center-of-gravity 98. The height (H) range is established for each counterweight lever 82, respectively. As an example, for a first counterweight lever 82a, a height plane 108 is defined extending along the fan assembly centerline axis 70 and orthogonal to the respective counterweight lever rotational axis 88a for the first counterweight lever 82a, and a counterweight trunnion portion 84a of the first counterweight lever 82 is located on a first side 110 of the height plane 108. The counterweight center-of-gravity 98 of the first counterweight lever 82a may be arranged at a height 112 from the height plane 108, where the height (H) satisfies: $H<0.5*R$.

Returning to FIG. 2, the blade-counterweight actuator assembly 78 includes a weight-blade shaft assembly 114 having a shaft 116. The shaft 116 may be supported by a forward shaft support 118 and by an aft shaft support 120, each of which may be fixedly connected with the fan blade hub 42. The forward shaft support 118 and the aft shaft support 120 slidingly engage with the shaft 116 to allow axial translation of the shaft 116 in the axial direction (A), but to limit radial movement of shaft 116 in the radial direction (R) with respect to the fan assembly centerline axis 70. The shaft 116 includes a fan blade engagement portion 122 that is arranged to drive rotation of each of the plurality of fan blades 40 about the respective blade pitch change axis P. More particularly, for each fan blade 40, a bearing member 126 may be implemented within the fan blade engagement portion 122 and the blade crank arm 76 of each fan blade 40 may be engaged with the bearing member 126, such that axial translation of the shaft 116 along the fan assembly centerline axis 70 drives the blade crank arm 76 and the fan blade trunnion 72 about the blade pitch change axis P so as to rotate the fan blade 40 about the blade pitch change axis P. In addition, the shaft 116 includes a counterweight engagement portion 124 that is arranged to drive rotation of each of the plurality of counterweight levers 82 about the respective counterweight lever rotational axis 88. More particularly, for each counterweight lever 82, a bearing member 128 may be implemented within the counterweight engagement portion 124 and a lever crank arm 130, which is connected to the counterweight trunnion portion 84, may be engaged with the bearing member 128, such that axial translation of the shaft 116 along the fan assembly centerline axis 70 drives the lever crank arm 130 and the counterweight trunnion portion 84 about the respective counterweight lever rotational axis 88 so as to rotate the counterweight lever 82. In FIG. 2, a ninety-degree rotated position of the counterweight levers 82 is shown in dashed lines as counterweight levers 82' for reference purposes.

To drive the shaft 116 in the axial direction (A) along the fan assembly centerline axis 70, the weight-blade shaft assembly 114 includes a hydraulic drive portion 132 arranged to drive axial movement of the shaft 116 in a forward direction 134 along the fan assembly centerline axis 70, and in an aft direction 136 along the fan assembly centerline axis 70. The hydraulic drive portion 132 may include a piston rod 138 that is fixedly connected to the shaft 116, and is also connected to a piston head 140. The piston head 140 is arranged to slidingly engage with a piston housing 144 so that the piston head 140 can translate in the axial direction (A) within the piston housing 144. The piston rod 138 includes a hydraulic fluid passage 142 therewithin, and a flow of a hydraulic fluid 143 (e.g., oil) can flow therethrough into a piston cavity 146. The hydraulic fluid 143 is driven by a pressure source (not shown) to flow into and out of the hydraulic fluid passage 142 and into and out of the piston cavity 146, so as to drive the piston head 140 and the shaft 116 in the forward direction 134 and in the aft direction 136. The pressure source is controlled, for example, by the engine controller 50 based on command signals to change the pitch angle of the fan blades 40 (i.e., to either increase the pitch angle of the fan blades 40 or to decrease the pitch angle of the fan blades 40). An inner diameter 148 of the shaft 116 is greater than an outer diameter 150 of the piston housing 144 so that the inner diameter 148 of the shaft 116 can slidingly engage the outer diameter of the piston housing 144 during axial translation of the shaft 116. Thus, the blade-counterweight actuator assembly 78 is actuated to provide axial movement of the shaft 116 in the forward direction 134 and in the aft direction 136, causing rotation of each of the fan blades 40 about their respective pitch change axis P to change the pitch angle of each fan blade 40, and, at the same time, the shaft 116 drives rotation of each of the counterweight levers 82 about their respective counterweight lever rotational axis 88.

Figure 4A:
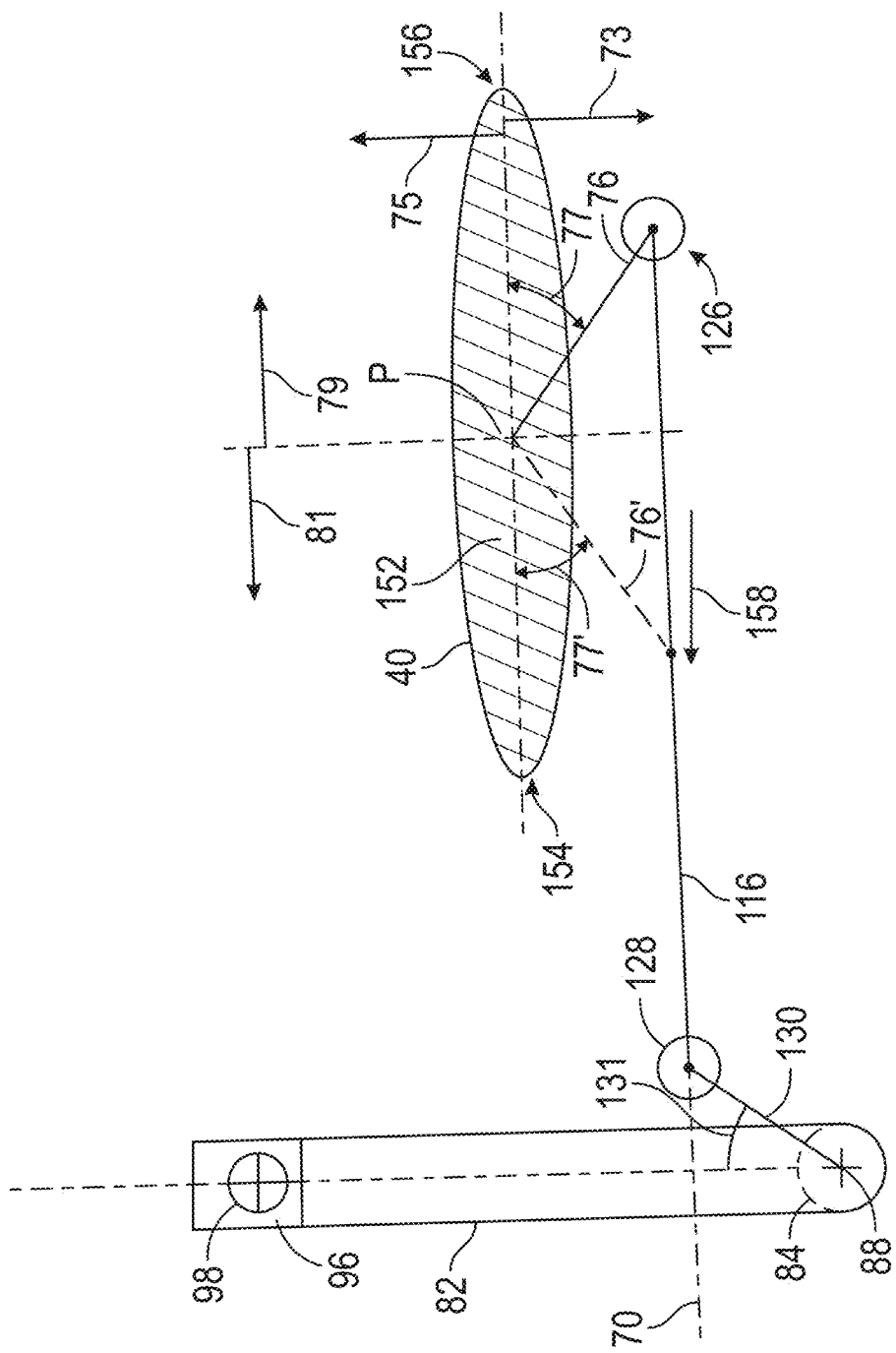
FIG. 4A depicts a rotational relationship between a fan blade and a counterweight lever from view 4-4 of FIG. 2, according to an aspect of the present disclosure.

FIG. 4A depicts a rotational relationship between a fan blade 40 and a counterweight lever 82 from view 4-4 of FIG. 2, according to an aspect of the present disclosure. In FIG. 4A, the shaft 116, the blade crank arm 76, the bearing member 126, the lever crank arm 130, and the bearing member 128 are shown generally. In FIG. 4A, the fan blade 40 is shown to be rotated about the blade pitch change axis P so that the fan blade 40 is arranged in a feather position in which a blade chord 152 extending from a leading edge 154 to a trailing edge 156 of the fan blade 40 is generally parallel to a direction of flight 158 of an aircraft upon which the engine 10 is mounted. The blade crank arm 76 is shown as being arranged on a port side 73, with respect to the direction of flight 158, of the blade chord 152 and on a downstream side 79 of the blade pitch change axis P extending from the blade pitch change axis P at a blade crank arm angle 77. As was described above, the blade crank arm 76 is connected to the bearing member 126, which is connected to the shaft 116 via the fan blade engagement portion 122 (FIG. 2). In FIG. 4A, with the fan blades 40 rotated to the feather position, there may be negligible torque imparted by the fan blade 40 about the blade pitch change axis P. Alternatively, the blade crank arm 76 may be arranged as a blade crank arm 76' arranged on the port side 73 of the blade chord 152, but, be arranged on an upstream side 81 of the blade pitch change axis P at a blade crank arm angle 77'. Yet still alternatively, while not shown in FIG. 4A, the blade crank arm 76 may be arranged as a mirror image across the blade chord 152 on a starboard side 75 of the blade chord 152, and may be arranged at a mirror image to the blade crank arm angle 77. Similarly, while not shown in FIG. 4A, the blade crank arm 76' may be arranged as a mirror image across the blade chord 152 on the starboard side 75 of the blade chord 152, and at a mirror image of the blade crank arm angle 77'. The particular arrangement of the blade crank arm 76 (or the blade crank arm 76') affects a direction of an axial force imparted to the shaft 116, and the lever crank arm 130 is arranged to as to provide an opposing axial force to the axial force imparted by the blade crank arm 76.

In FIG. 4A, the counterweight lever 82 is shown in the retracted position, and, in the retracted position, the counterweight lever rotational axis 88 and the counterweight center-of-gravity 98 are arranged in a first rotational plane 172. The counterweight levers 82 may be in the retracted position in conjunction with the fan blades 40 being in the feather position. When the counterweight lever 82 is rotated about the fan assembly centerline axis 70, and when the counterweight system 45 is in the retracted position as shown in FIG. 4A, the counterweight 96 imparts negligible torque or no torque about the counterweight lever rotational axis 88. The lever crank arm 130 is connected to the bearing member 128, which is connected to the shaft 116 via the counterweight engagement portion 124 (FIG. 2). The lever crank arm 130 may be arranged at a lever crank arm angle 131, similar to the blade crank arm angle 77. The lever crank arm angle 131 and the blade crank arm angle 77 may be different angular amounts from each another. The arrangement of the blade crank arm 76 with respect to the blade pitch change axis P, and the arrangement of the lever crank arm 130 with respect to the counterweight lever rotational axis 88 are such that, upon axial translation of the shaft 116 to rotate the fan blades 40 about the blade pitch change axis P, which imparts an axial force to the shaft 116, the counterweight lever 82 rotates correspondingly to provide a counteracting axial force to the shaft 116.

Figure 4B:
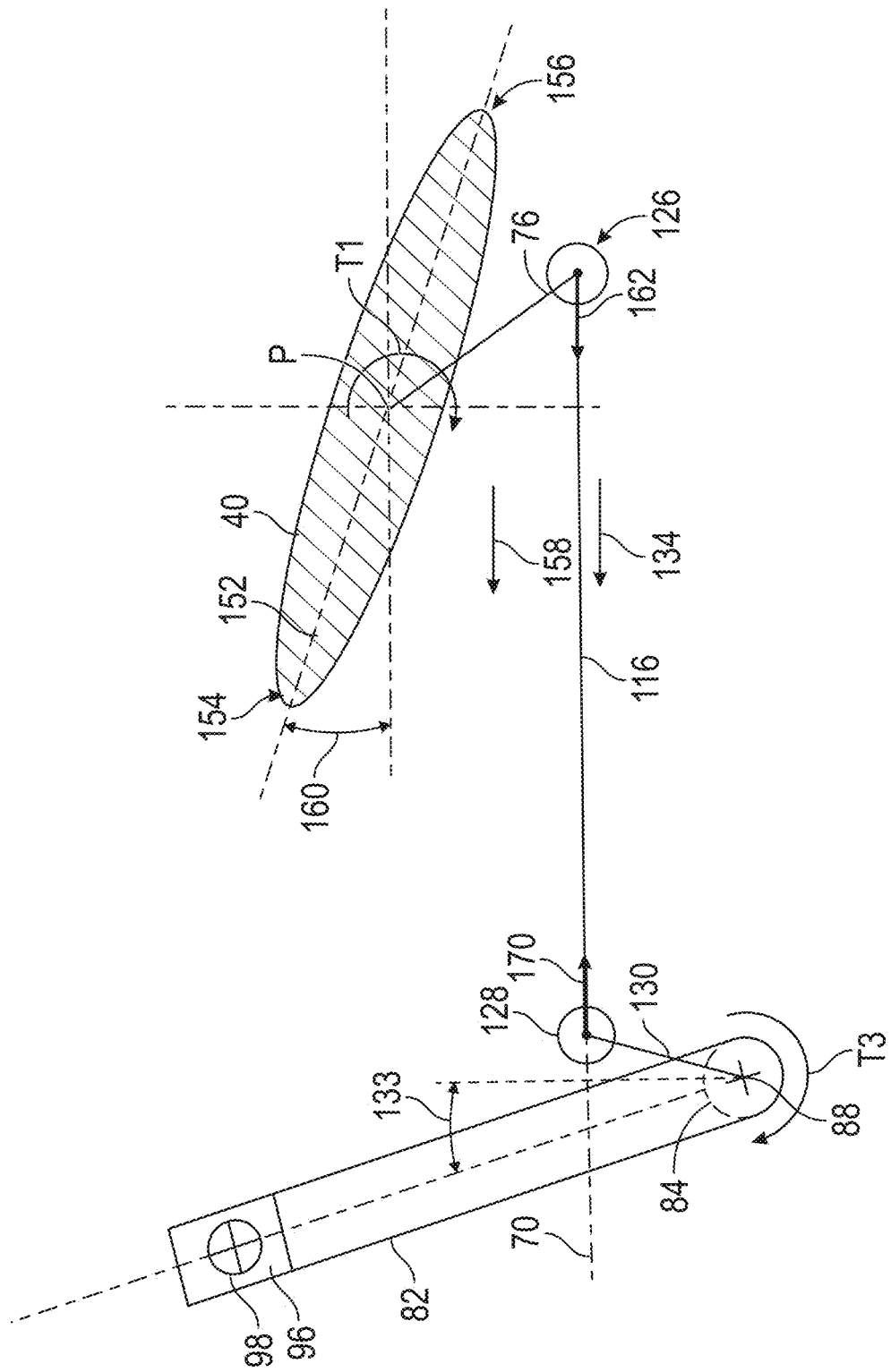
FIG. 4B depicts a rotational relationship between the fan blade and the counterweight lever of FIG. 4A, but with a course rotation of the fan blade, according to an aspect of the present disclosure.

FIG. 4B depicts a rotational relationship between the fan blade 40 and the counterweight lever 82 of FIG. 4A, but with a course rotation of the fan blade 40, according to an aspect of the present disclosure. In FIG. 4B, the shaft 116 is actuated in an axially forward direction 134, and the axial translation of the shaft 116 causes rotation of the fan blade 40 to be rotated to increase the angle of attack of the fan blade 40 by an angle 160. The course increase in the angle of attack of FIG. 4B results in a twisting moment (or torque T1) imparted by the fan blade 40 about the blade pitch change axis P. The torque T1, in turn, imparts an axial force 162 by the blade crank arm 76 to the fan blade engagement portion 122 (FIG. 3) of the shaft 116.

Simultaneously with the rotation of the fan blades 40, the axial translation of the shaft 116 drives the lever crank arm 130 to rotate the counterweight lever 82 about the counterweight lever rotational axis 88 by an angle 133. The rotation of the counterweight lever 82 shifts the counterweight center-of-gravity 98 axially forward such that the counterweight center-of-gravity 98 rotates about the fan assembly centerline axis 70 (FIG. 2) within a second rotational plane 174. As will be described in more detail below, the axial shifting of the counterweight center-of-gravity 98 imparts a moment (or torque) T3 to the counterweight trunnion portion 84 about the counterweight lever rotational axis 88. The torque T3 imparts an axial force 170 to the shaft 116 via the lever crank arm 130 and the bearing member 128. The counterweight system 45 (FIG. 2) is designed so that the axial force 170 is relatively equal to, but opposite to, the axial force 162 imparted to the shaft 116 by the blade crank arm 76. In the arrangement of FIG. 4B, the axial force 162 and the axial force 170 apply a compression force to the shaft 116.

Figure 4C:
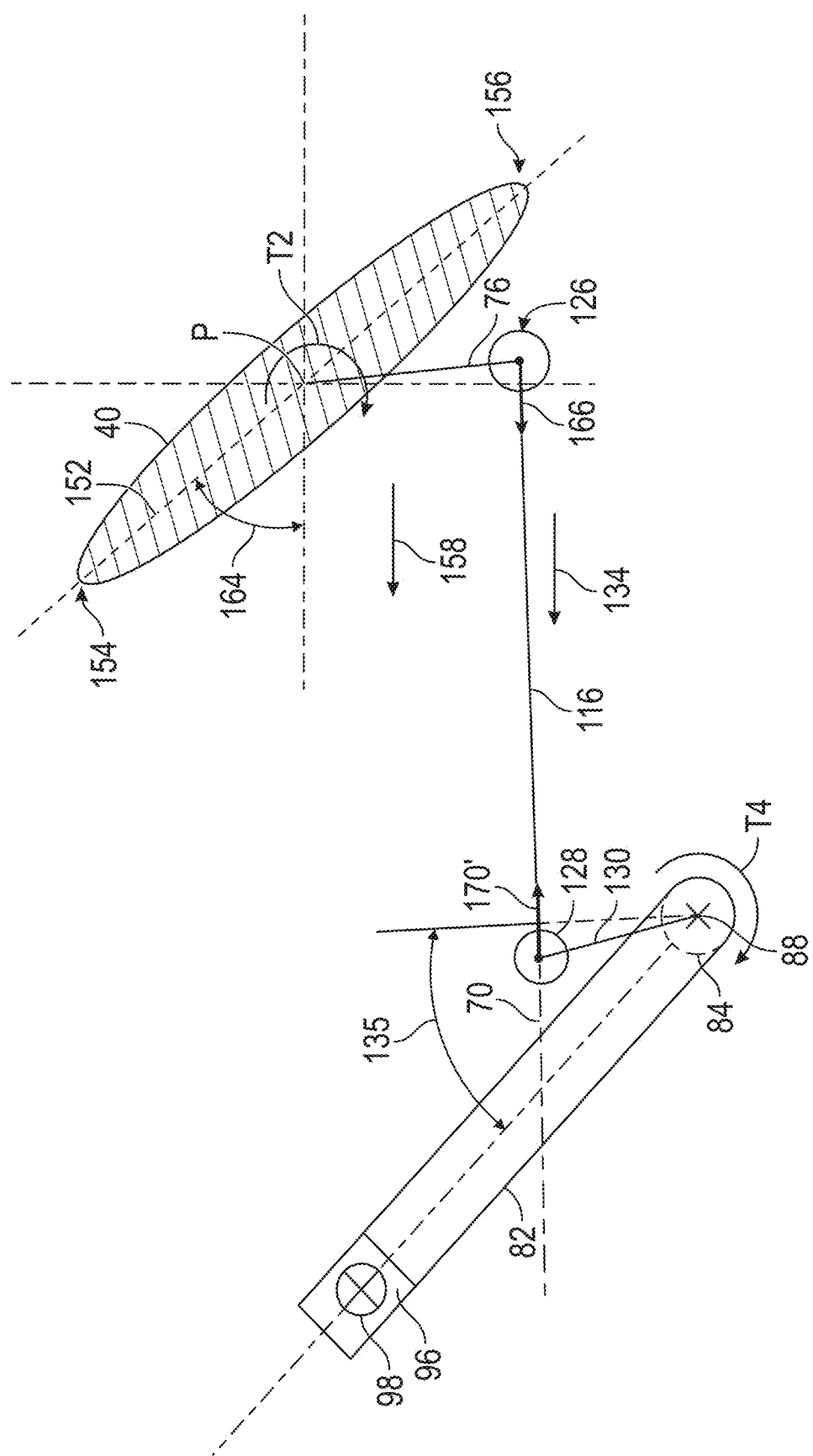
FIG. 4C depicts a rotational relationship between the fan blade and the counterweight lever of FIG. 4B, but with a further course rotation of the fan blade, according to an aspect of the present disclosure.

FIG. 4C depicts a rotational relationship between the fan blade 40 and the counterweight lever 82 of FIG. 4B, but with a further course rotation of the fan blade 40, according to an aspect of the present disclosure. In FIG. 4C, the shaft 116 is further actuated in the axially forward direction 134 from the position shown in FIG. 4B, and the further axial translation of the shaft 116 causes further rotation of the fan blade 40 to further increase the angle of attack of the fan blade 40 by an angle 164. The further course increase in the angle of attack of FIG. 4C results in a twisting moment (or torque T2) imparted by the fan blade 40 about the blade pitch change axis P to the blade crank arm 76. The torque T2, in turn, imparts an additional axial force 166 by the blade crank arm 76 to the fan blade engagement portion 122 (FIG. 3) of the shaft 116.

Simultaneously with the further rotation of the fan blades 40, the axial translation of the shaft 116 further drives the lever crank arm 130 to further rotate the counterweight lever 82 about the counterweight lever rotational axis 88 by an angle 135. The rotation of the counterweight lever 82 further shifts the counterweight center-of-gravity 98 axially forward such that the counterweight center-of-gravity 98 rotates about the fan assembly centerline axis 70 (FIG. 2) within a third rotational plane 176. As will be described in more detail below, the axial shifting of the counterweight center-of-gravity 98 imparts a moment (or torque) T4 to the counterweight trunnion portion 84 about the counterweight lever rotational axis 88. The torque T4 imparts a further axial force 170' to the shaft 116 via the lever crank arm 130 and the bearing member 128. Again, the counterweight system 45 (FIG. 2) is designed so that the axial force 170' is relatively equal to, but opposite to, the axial force 166 imparted to the shaft 116 by the blade crank arm 76. In the arrangement of FIG. 4C, the axial force 166 and the axial force 170' apply an additional compression force to the shaft 116.

Figure 5:
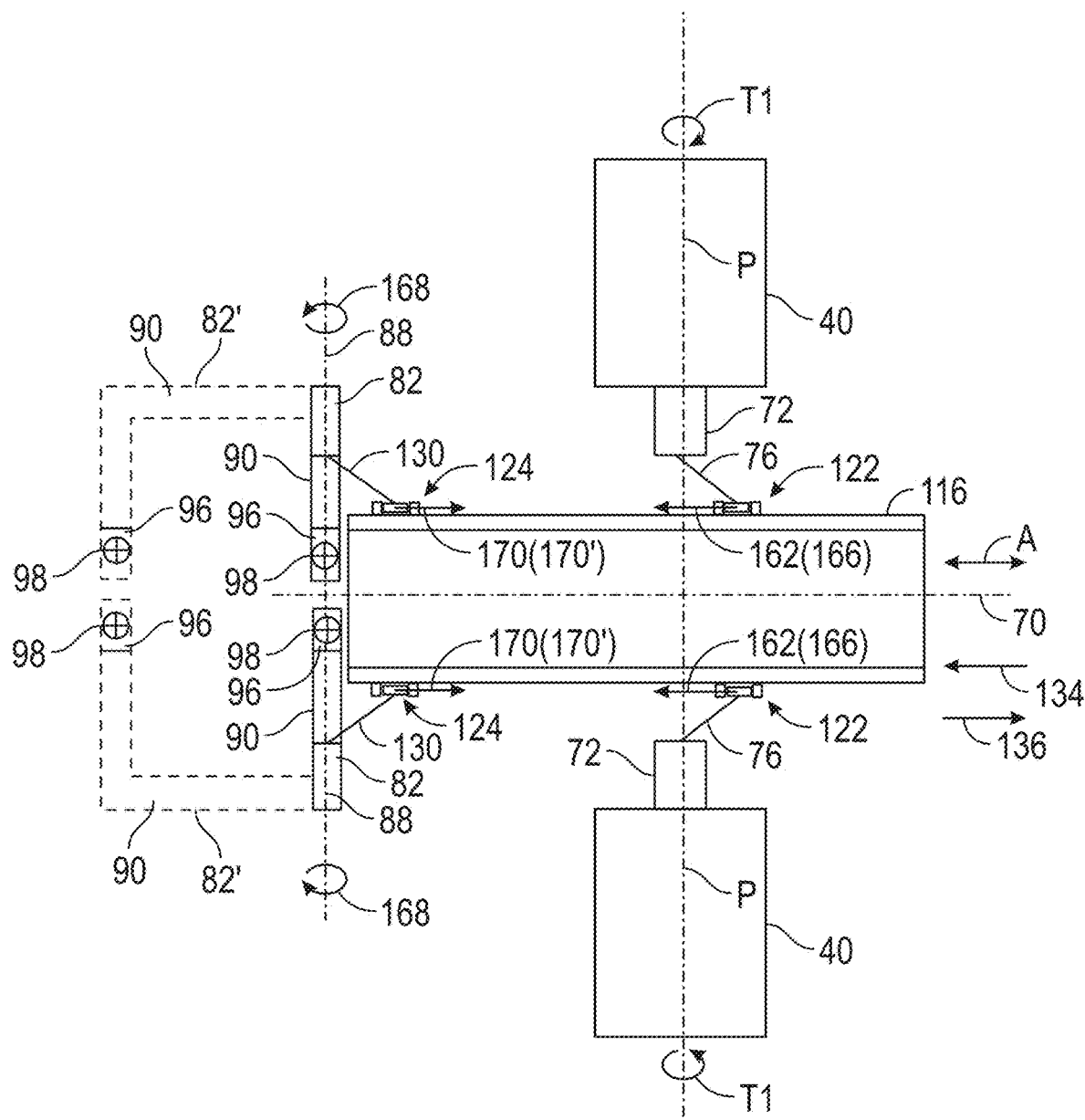
FIG. 5 is a schematic diagram depicting a balance of forces between fan blades and counterweights, according to an aspect of the present disclosure.

FIG. 5 is a schematic diagram depicting a balance of forces between fan blades and counterweights, according to an aspect of the present disclosure. In FIG. 5, various components of FIG. 2 and FIG. 3 described above are shown generally with the same reference numerals as in FIG. 2 and in FIG. 3. As described above for FIG. 4B, the rotation of the fan blades 40 with the course angle of attack increased by the angle 160 results in the fan blades 40 imparting the torque T1 about the blade pitch change axis P, which imparts the axial force 162 to the fan blade engagement portion 122 of the shaft 116. As shown in FIG. 4B and in FIG. 5, the axial force 162 may be in the forward direction 134, depending on the arrangement of the blade crank arm 76 in relation to the blade chord 152 as described above with regard to FIG. 4A. On the other hand, the axial translation of the shaft 116 also causes rotation of each of the counterweight levers 82 about the counterweight lever rotational axis 88. As will explained below, the rotation of counterweight levers 82 about the counterweight lever rotational axis 88 shifts the axial location of a plane of rotation of each of the counterweights 96 about the fan assembly centerline axis 70, and results in the counterweights 96 imparting a torque 168 to the counterweight lever 82, which, in turn, imparts an axial force 170 to the counterweight engagement portion 124 via the lever crank arm 130. The axial force 170 is a reaction force that opposes the axial force 162 imparted to the shaft 116 by the fan blades 40, and the resultant axial forces (i.e., the axial force 162 and the axial force 170) apply a compressive force to the shaft 116. The compression force applied to the shaft 116, therefore, relieves axial forces that may otherwise be imparted to the hydraulic drive portion 132. The compression force is a result of the counterweight system 45 being arranged forward of the fan blade hub 42 so that the counterweight system 45 applies an aft directed axial force to the shaft 116. However, the counterweight system 45 may be arranged aft of the fan blade hub 42 instead. When the counterweight system 45 is arranged aft of the fan blade hub 42, a tensile force may be applied to the shaft 116 instead by virtue of the counterweight system 45 applying an aft directed force against the shaft 116 to counteract the forward directed axial force of the fan blades 40.

In the fan assembly 38, each fan blade 40 imparts the axial force 162 to the shaft 116, providing a total axial force to the shaft 116 that is a sum of the axial forces 162 imparted from each fan blade 40. In addition, each counterweight lever 82 imparts the axial force 170 to the shaft 116, providing a total axial force to the shaft 116 that is a sum of the axial forces 170 imparted from each counterweight lever 82. In balancing the counteracting axial forces 162 and the axial forces 170 in the fan assembly 38, a number of the counterweight levers 82 may be the same as a number of the fan blades 40, or the number of the counterweight levers 82 may be different from the number of fan blades 40. For example, the counterweight system 45 may include a greater number of counterweight levers 82 than the number of fan blades 40, or the counterweight system 45 may include fewer counterweight levers 82 than the number of fan blades 40. The number of counterweight levers 82 having the counterweights 96 that are implemented in the counterweight system 45, however, is sufficient so that the sum of the axial forces 170 imparted by the counterweight levers 82 balance out the sum of the axial forces 162 imparted by the fan blades 40. Thus, fewer counterweight levers 82 that include a greater counterweight mass of each counterweight 96 can be implemented to counteract axial forces 162 imparted to the shaft 116 by the fan blades 40. The implementation of fewer counterweight levers 82, even with a greater counterweight mass, provides the ability to reduce the overall weight of the counterweight system 45. Moreover, the implementation of the longer cantilever beam type counterweight lever 82, while rotating about the fan assembly centerline axis 70, takes advantage of centrifugal forces to impart a greater torque moment to the cantilever counterweight lever 82 by the spinning counterweight 96, reducing the overall counterweight mass needed to counteract the axial forces 162 imparted to the shaft 116 by the fan blades 40. The balancing of the axial forces 162 and the axial forces 170 also relieves pressure that may otherwise be added to the hydraulic drive portion 132 (FIG. 2) by the axial forces 162 imparted to the shaft 116 by the fan blades 40.

Figure 6:
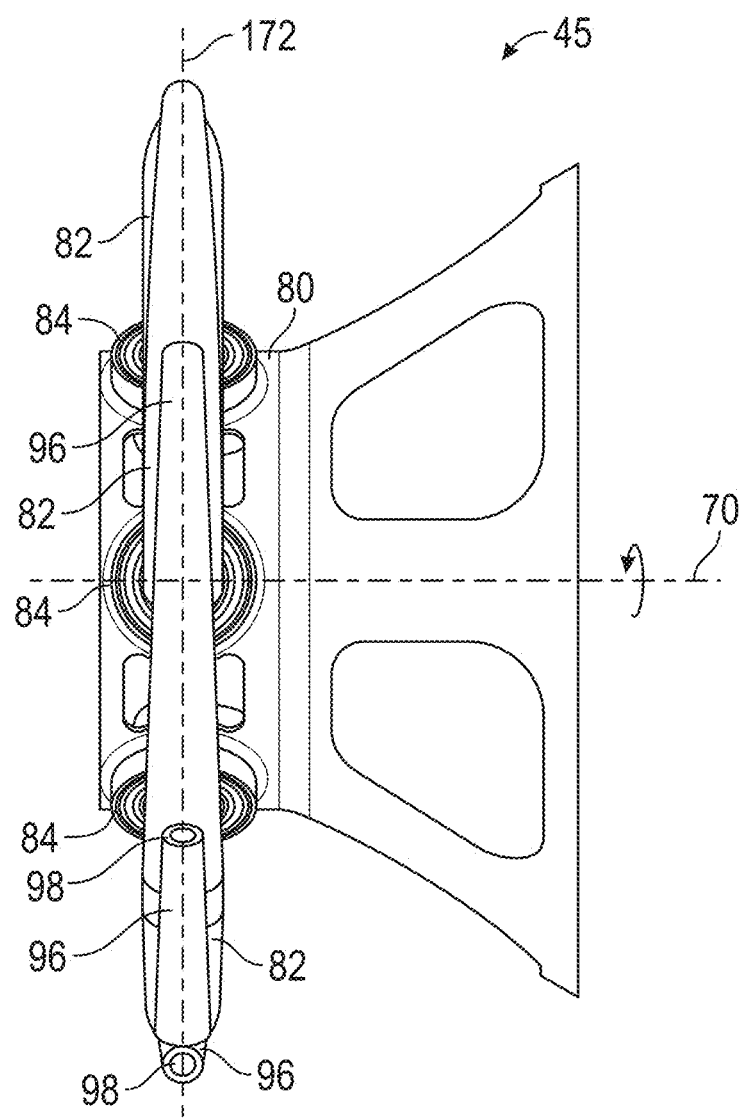
FIG. 6 is a side view of the counterweight system, according to an aspect of the present disclosure.

FIG. 6 is a side view of the counterweight system 45 shown in a retracted state, according to an aspect of the present disclosure. In FIG. 6, each of the counterweight levers 82 is shown to be arranged in a first rotational state where the counterweight levers 82 are rotated about their respective counterweight lever rotational axis 88 (FIG. 3) such that the counterweight center-of-gravity 98 of each of the counterweights 96 is retracted and arranged to rotate about the fan assembly centerline axis 70 in a first rotational plane 172. The first rotational plane 172 may, for example, pass through the counterweight center-of-gravity 98 of each counterweight lever 82 and through the counterweight lever rotational axis 88 of each counterweight lever 82. In operation of the fan assembly 38, the fan assembly 38 is driven by the fan shaft 35 to rotate about the fan assembly centerline axis 70. The blade-counterweight actuator assembly 78 is driven by the engine controller 50 to rotate the fan blades 40 about their respective blade pitch change axis P to be in a desired pitch state. The arrangement of the counterweight levers 82 in FIG. 6 are shown in the retracted state and may correspond to, for example, the case when the blade-counterweight actuator assembly 78 drives the fan blades 40 to be in the feather position (FIG. 4A). When the counterweight levers 82 are arranged about their respective counterweight lever rotational axis 88, as shown in FIG. 6, with the first rotational plane 172 passing through the counterweight lever rotational axis 88 of each counterweight lever 82, negligible torque or no torque is imparted by the counterweights 96 about the counterweight lever rotational axis 88 when the fan assembly 38 is driven to rotate about the fan assembly centerline axis 70.

Figure 7:
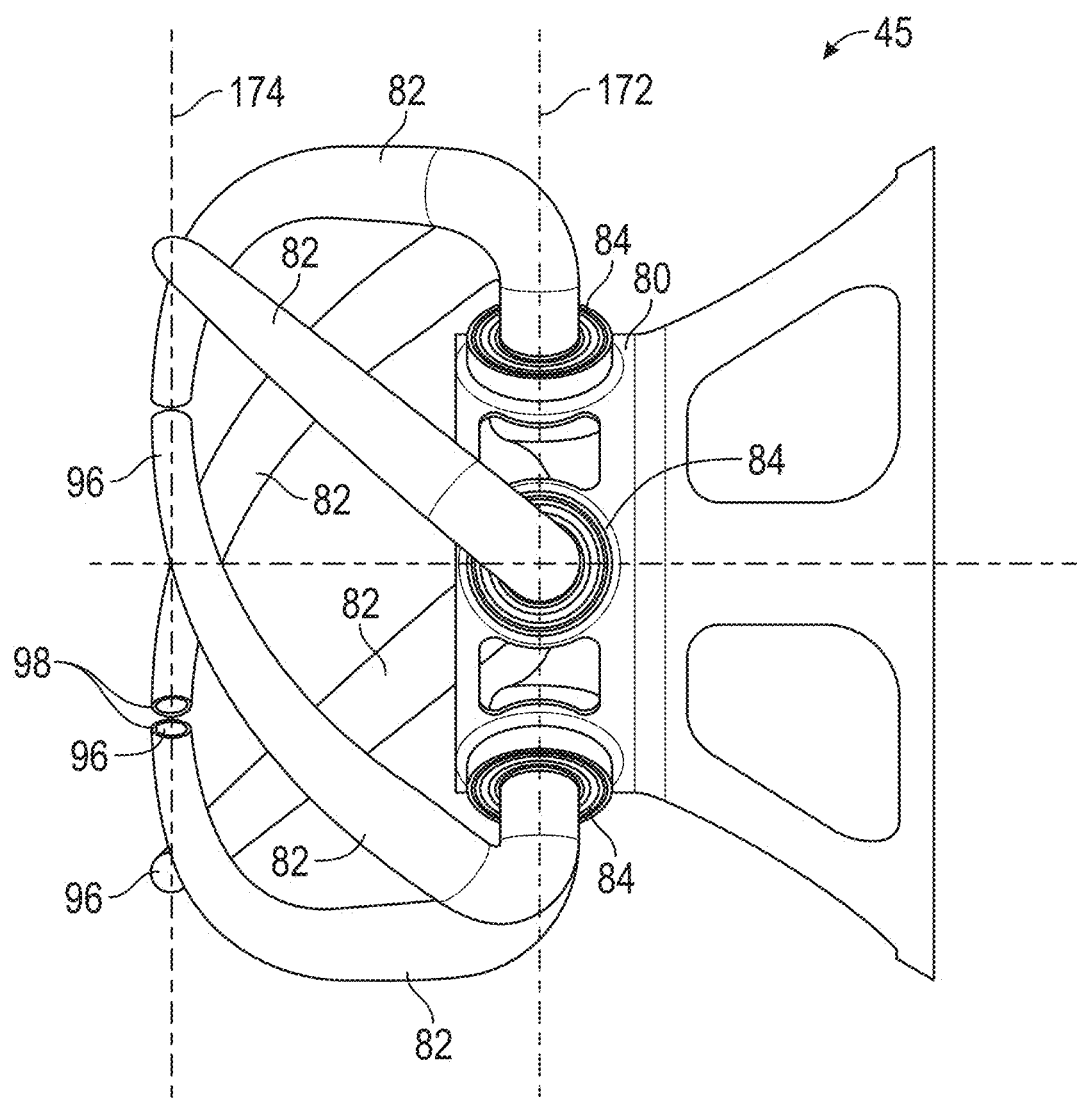
FIG. 7 is a side view of the counterweight system, according to another aspect of the present disclosure.

FIG. 7 is a side view of the counterweight system 45 shown in a partially extended state, according to another aspect of the present disclosure. In FIG. 7, during operation of the fan assembly 38 being driven to rotate about the fan assembly centerline axis 70, the blade-counterweight actuator assembly 78 is actuated by the engine controller 50 to rotate the fan blades 40 about their respective blade pitch change axis P and to rotate each of the counterweight levers 82 about their respective counterweight lever rotational axis 88 (FIG. 3), such that the counterweight center-of-gravity 98 of each of the counterweights 96 is arranged to rotate about the fan assembly centerline axis 70 in a second rotational plane 174. The rotation of the counterweight levers 82 may correspond to, for example, the blade-counterweight actuator assembly 78 being actuated to rotate the fan blades 40 to the course angle of attack of the fan blades 40 by the angle 160 (FIG. 4B). When the fan blades 40 are rotated by the angle 160 by the axial translation of the shaft 116 (FIG. 2), each of the counterweight levers 82 also rotates about their respective counterweight lever rotational axis 88. The rotation of the counterweight levers 82 about their respective counterweight lever rotational axis 88 axially shifts the counterweight center-of-gravity 98 of each of the counterweights 96 to rotate about the fan assembly centerline axis 70 in the second rotational plane 174. When the counterweight levers 82 are rotated about their respective counterweight lever rotational axis 88, as shown in FIG. 7, the counterweights 96 rotating about the fan assembly centerline axis 70 in the second rotational plane impart the axial force 170 to the shaft 116 to counteract the axial force 162 imparted to the shaft 116 by the fan blades 40.

Figure 8:
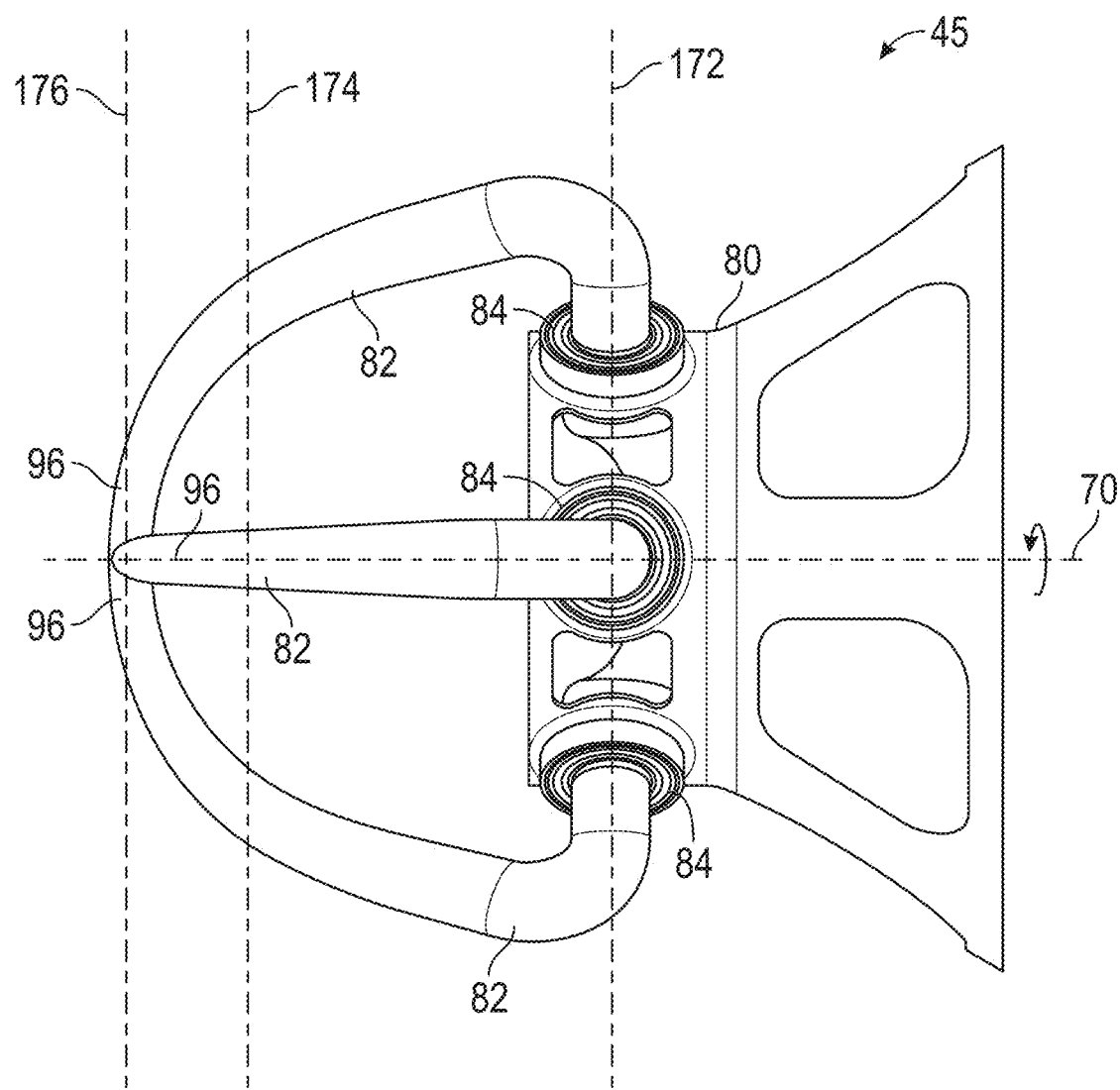
FIG. 8 is a side view of the counterweight system, according to another aspect of the present disclosure.

FIG. 8 is a side view of the counterweight system 45 shown in a fully extended state, according to another aspect of the present disclosure. In FIG. 8, the blade-counterweight actuator assembly 78 is further actuated by the engine controller 50 so that each of the counterweight levers 82 are further rotated about their respective counterweight lever rotational axis 88 (FIG. 3), and the counterweight center-of-gravity 98 of each of the counterweights 96 is arranged to rotate about the fan assembly centerline axis 70 in a third rotational plane 176 that is shifted axially forward from the second rotational plane 174. In FIG. 8, each of the counterweight levers 82 is shown to be rotated ninety degrees about their respective counterweight lever rotational axis 88 from the position shown in FIG. 6. That is, for example, the angle 135 (FIG. 4C) may be ninety degrees such that the counterweight levers 82 of FIG. 8 correspond to the counterweight levers 82' of FIG. 5. The rotation of the counterweight levers 82 of FIG. 8 may correspond to, for example, the further course angle of attack increase of the fan blades 40 by the angle 164 (FIG. 4C). When the fan blades 40 are rotated by the angle 164 by the further axial translation of the shaft 116 (FIG. 2), each of the counterweight levers 82 also rotate about their respective counterweight lever rotational axis 88. The rotation of the counterweight levers 82 shifts the counterweight center-of-gravity 98 of each of the counterweights 96 to rotate about the fan assembly centerline axis 70 in the third rotational plane 176. When the counterweight levers 82 are rotated about the fan assembly centerline axis 70 in the arrangement as shown in FIG. 8, the counterweights 96 impart a further axial force 170' (FIG. 5) to the shaft 116, to counteract the axial force 166 imparted to the shaft 116 by the fan blades 40.

As generally shown in FIG. 6, FIG. 7, and FIG. 8, each of the counterweight levers 82 may generally have a tapered tubular-shaped structure. Of course, other structural shapes (i.e., cross-sectional shapes) of the counterweight levers 82 may be implemented, such as an I-beam type structure, or a box-beam type structure. In addition, each counterweight lever 82 may be a machined part that is metallic or may be manufactured via additive manufacturing processes. Alternatively, each counterweight lever 82 may be a composite part that is manufactured via composite material construction.

Figure 9:
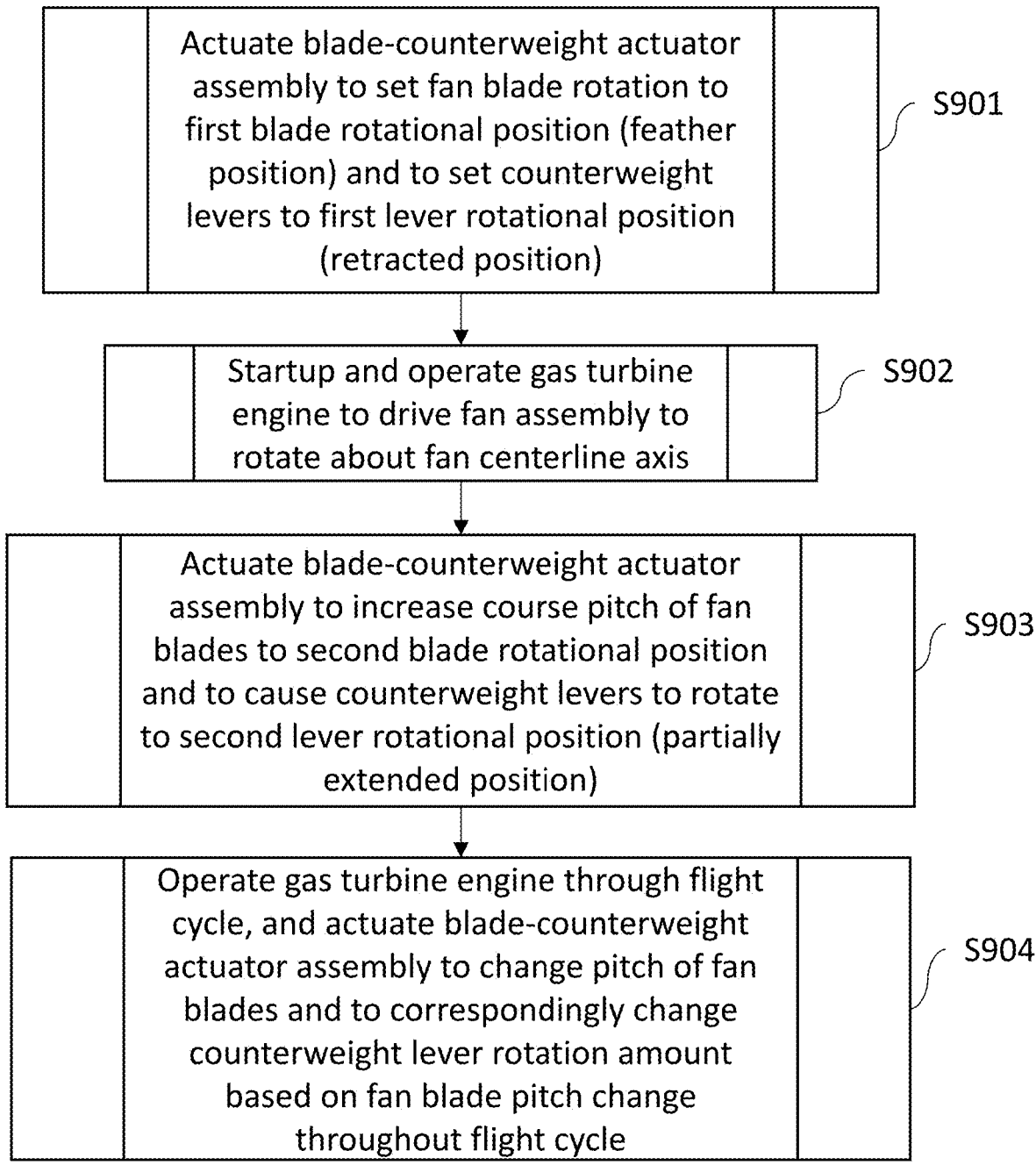
FIG. 9 is a flowchart of process steps for a method of operating a gas turbine engine, according to an aspect of the present disclosure.

FIG. 9 is a flowchart of process steps for a method of operating a gas turbine engine, according to an aspect of the present disclosure. In regard to the method of FIG. 9, the method may be implemented in the gas turbine engine 10 as described above, including the controller 50 controlling the operation of the gas turbine engine 10 and controlling operation of the fan assembly 38. In step S901, before starting of the gas turbine engine 10, the controller 50 provides control commands to the fan actuation system 41 is actuated to control the blade-counterweight actuator assembly 78 to rotate the fan blades 40 to set the fan blades 40 to be arranged at a first blade rotational position (e.g., to be arranged in the feather position of FIG. 4A), and, correspondingly, in unison with rotating the fan blades 40, to rotate each of the counterweight levers 82 to be arranged in a first lever rotational position (e.g., in the retracted position of FIG. 4A and FIG. 6). In step S902, the gas turbine engine 10 is started up and operated as described above to cause the compressor section 21, the combustor 26, and the turbine section 27 to operate, and for the low-pressure turbine 30 to drive the fan assembly 38 via the low-pressure rotor shaft 36, the reduction gearbox assembly 37 and the fan shaft 35.

Once the gas turbine engine 10 has been started up, in step S903, the controller controls the fan actuation system 41 to actuate the blade-counterweight actuator assembly 78 to rotate the fan blades 40 about their respective blade pitch change axis P to increase the course pitch of the fan blades 40 (e.g., to rotate the fan blades 40 to increase the blade angle of attack to the angle 160 of FIG. 4B). The rotation amount may vary, but, for the present step, it is assumed that the amount of blade pitch is to provide for taxiing of an aircraft upon which the gas turbine engine 10 is mounted. Simultaneously with the rotation of the fan blades 40 by the blade-counterweight actuator assembly 78, the blade-counterweight actuator assembly 78 rotates each of the counterweight levers 82 about their respective counterweight lever rotational axis 88. For example, in step S902, the fan blades 40 and the counterweight levers 82 are rotated in unison as shown in FIG. 4B and in FIG. 7.

In step S904, the gas turbine engine 10 is continuously operated through various phases of a flight cycle (e.g., taxiing, take-off, climb-out, cruise, decent, approach, landing, and thrust reversal of the aircraft). Throughout the various phases, the fan actuation system 38 is controlled by the controller 50 to increase/decrease the pitch of the fan blades 40, and to correspondingly increase/decrease the angular rotation amount of each of the counterweight levers 82.

The foregoing aspects provide a counterweight system that is located remotely from the fan blades, but that can counteract forces imparted into the fan assembly by, for example, twisting moments of the fan blades. The inclusion of the counterweight levers provides the ability to locate the counterweights as far from the overall mass of the counterweight system and weight of the counterweight system can be reduced over conventional counterweight systems having a counterweight attached to the fan blades (e.g., attached to a trunnion of the fan blades, or attached via a linkage connected to the fan blades).

Further aspects are provided by the subject matter of the following clauses.

A fan assembly for a gas turbine engine, the fan assembly defining a fan assembly centerline axis, the fan assembly including a fan actuation system, a fan blade hub, a plurality of fan blades, each fan blade being rotationally connected to the fan blade hub and connected to the fan actuation system, the fan actuation system being arranged to rotate each fan blade about a respective blade pitch change axis, and a counterweight system arranged disconnected from the plurality of fan blades and being connected to the fan actuation system, the counterweight system including (a) a counterweight hub, and (b) a plurality of counterweight levers, each counterweight lever having (i) a counterweight trunnion portion rotationally connected to the counterweight hub and connected to the fan actuation system that rotates each counterweight lever about a respective counterweight lever rotational axis extending through the counterweight trunnion portion and extending radially from the fan assembly centerline axis, (ii) a cantilever arm having a first end connected to the counterweight trunnion portion and a second end offset from the respective counterweight lever rotational axis, and (iii) a counterweight connected to the second end, the counterweight having a counterweight center-of-gravity, wherein the fan actuation system is arranged to correspondingly rotate each of the plurality of fan blades and each of the plurality of counterweight levers in unison.

The fan assembly according to the preceding clause further including a spinner fairing surrounding the counterweight system and extending circumferentially about the fan assembly centerline axis, wherein a radial extent of each of the plurality of counterweight levers is defined by a circumference about the fan assembly centerline axis having a radial distance (R) extending orthogonally from the fan assembly centerline axis, the radial extent providing a clearance between an inner circumference of the spinner fairing and each of the plurality of counterweight levers, and for each one of the plurality of counterweight levers, the counterweight center-of-gravity is arranged a length (L) extending perpendicularly from the respective counterweight lever rotational axis to the counterweight center-of-gravity and satisfies a relationship: R<L>0.5*R.

The fan assembly according to any preceding clause, wherein, for each counterweight lever, a height plane is defined extending along the fan assembly centerline axis and orthogonal to the respective counterweight lever rotational axis, the counterweight trunnion portion being arranged on a first side of the height plane, and the counterweight center-of-gravity is arranged at a height (H) from the height plane on the first side of the height plane, wherein H<0.5*R.

The fan assembly according to any preceding clause, wherein a first rotational plane about the fan assembly centerline axis of the counterweight center-of-gravity of each counterweight lever is defined radially orthogonal to the fan assembly centerline axis, and, in a first rotational state of the counterweight system, each of the counterweight levers is rotationally positioned at a first rotational position about their respective counterweight lever rotational axis, such that the respective counterweight lever rotational axis and the counterweight center-of-gravity of the respective counterweight are arranged in the first rotational plane, the first rotational state defining a first axial position of the first rotational plane along a length of the fan assembly centerline axis.

The fan assembly according to any preceding clause, wherein, in the first rotational state, each counterweight lever is configured such that a portion of the second end of the counterweight lever overlaps circumferentially with a portion of the first end of a circumferentially spaced apart adjacent counterweight lever.

The fan assembly according to any preceding clause, wherein a second rotational plane about the fan assembly centerline axis of the counterweight center-of-gravity of each counterweight lever is defined radially orthogonal to the fan assembly centerline axis and is axially shifted in a first direction along the fan assembly centerline axis from the first axial position, and, in a second rotational state of the counterweight system, each of the counterweight levers is rotationally positioned at a second rotational position about their respective counterweight lever rotational axis such that the counterweight center-of-gravity of the respective counterweight is arranged in the second rotational plane, the second rotational state defining a second axial position of the second rotational plane along the length of the fan assembly centerline axis.

The fan assembly according to any preceding clause, wherein the second rotational position is rotated between eighty degrees and one hundred ten degrees about the respective counterweight lever rotational axis from the first rotational position.

The fan assembly according to any preceding clause, wherein the fan actuation system includes a blade-counterweight actuator assembly configured to be actuated in an axial direction along the fan assembly centerline axis, the blade-counterweight actuator assembly being connected to each of the plurality of fan blades and connected to each counterweight trunnion portion of the plurality of counterweight levers, such that axial movement of the blade-counterweight actuator assembly along the fan assembly centerline axis causes rotation of each fan blade about their respective fan blade pitch axis, and causes rotation of each counterweight lever about their respective counterweight lever rotational axis.

The fan assembly according to any preceding clause, wherein the blade-counterweight actuator assembly includes a weight-blade shaft assembly having a shaft that includes a fan blade engagement portion arranged to drive rotation of each of the plurality of fan blades about the respective blade pitch change axis, and a counterweight engagement portion arranged to drive rotation of each of the plurality of counterweight levers about the respective counterweight lever rotational axis.

The fan assembly according to any preceding clause, wherein the weight-blade shaft assembly further includes a hydraulic drive portion arranged to drive axial movement of the shaft in a forward direction along the fan assembly centerline axis and in an aft direction along the fan assembly centerline axis.

The fan assembly according to any preceding clause, wherein, in operation, the fan assembly is driven to rotate about the fan assembly centerline axis, and the blade-counterweight actuator assembly is actuated to change a pitch angle of each of the fan blades about their respective blade pitch change axis, and to rotate each of the plurality of counterweight levers about their respective counterweight lever rotational axis to axially shift a plane of rotation of each counterweight about the fan assembly centerline axis.

The fan assembly according to any preceding clause, wherein a change of the pitch angle of each fan blade imparts a blade moment about the respective blade pitch change axis, which imparts a first axial load in a first axial direction with respect to the fan assembly centerline axis to the fan blade engagement portion of the weight-blade shaft assembly, and the rotation of each of the plurality of counterweight levers about their respective counterweight lever rotational axis imparts a counterweight moment about the respective counterweight lever rotational axis, which imparts a second axial load in a second axial direction opposite the first axial direction with respect to the fan assembly centerline axis to the counterweight engagement portion of the weight-blade shaft assembly.

The fan assembly according to any preceding clause, wherein the first axial load in the first axial direction and the second axial load in the second axial direction impart a compression force to the weight-blade shaft assembly.

The fan assembly according to any preceding clause, wherein a number of the counterweight levers implemented in the counterweight system is the same as a number of the fan blades.

The fan assembly according to any preceding clause, wherein a number of the counterweight levers implemented in the counterweight system is different from a number of the fan blades.

The fan assembly according to any preceding clause, wherein the number of counterweight levers implemented in the counterweight system is less than the number of the fan blades.

The fan assembly according to any preceding clause, wherein a rotational angle range of rotation of each of the counterweight levers about the counterweight lever rotational axis is in a range from zero degrees to one hundred ten degrees.

The fan assembly according to any preceding clause, wherein the counterweight system is arranged axially forward of the fan blade hub, with respect to the fan assembly centerline axis.

The fan assembly according to any preceding clause, wherein, in a case when the fan blades are arranged in a feather position, each of the counterweight levers is arranged in a retracted position.

The fan assembly according to any preceding clause, wherein, in a case when the fan blades are rotated to increase a course angle of attack, each of the counterweight levers is rotated a corresponding amount about their respective counterweight lever rotational axis to shift the center-of-gravity of each counterweight axially forward, with respect to the fan assembly centerline axis.

The fan assembly according to any preceding clause, wherein each fan blade includes a fan blade crank arm arranged to drive rotation of the fan blade about the respective fan blade pitch change axis, and each counterweight lever includes a lever crank arm arranged to drive rotation of the counterweight lever about the respective counterweight lever rotational axis.

The fan assembly according to any preceding clause, wherein each fan blade crank arm is connected to a bearing member that is connected to a fan blade engagement portion of the shaft of the weight-blade shaft assembly, and each lever crank arm is connected to a bearing member that is connected to a counterweight engagement portion of the shaft of the weight-blade shaft assembly.

The fan assembly according to any preceding clause, wherein the fan blade crank arm is angularly offset from the fan blade pitch change axis, and the lever crank arm is angularly offset from the counterweight lever rotational axis.

The fan assembly according to any preceding clause, wherein each counterweight lever is additively manufactured.

The fan assembly according to any preceding clause, wherein each counterweight lever is one of a metallic structure, or a composite structure.

The fan assembly according to any preceding clause, wherein each counterweight lever has an I-beam type structure.

The fan assembly according to any preceding clause, wherein each counterweight lever has a tapered tubular-shaped structure.

The fan assembly according to any preceding clause, wherein each counterweight lever has a box-beam type structure.

A gas turbine engine including a compressor section, a combustor, a turbine section, and a fan assembly, the fan assembly defining a fan assembly centerline axis, the fan assembly comprising (a) a fan actuation system, (b) a fan blade hub, (c) a plurality of fan blades, each fan blade being rotationally connected to the fan blade hub and connected to the fan actuation system, the fan actuation system being arranged to rotate about a respective blade pitch change axis, and (d) a counterweight system arranged disconnected from the plurality of fan blades and being connected to the fan actuation system, the counterweight system including (i) a counterweight hub and (ii) a plurality of counterweight levers, each of the counterweight levers having (1) a counterweight trunnion portion rotationally connected to the counterweight hub and connected to the fan actuation system that rotates each counterweight lever about a respective counterweight lever rotational axis extending through the counterweight trunnion portion and extending radially from the fan assembly centerline axis, (2) a cantilever arm having a first end connected to the counterweight trunnion portion and a second end offset from the respective counterweight lever rotational axis, and (3) a counterweight connected to the second end, the counterweight having a counterweight center-of-gravity, wherein the fan actuation system is arranged to correspondingly rotate each of the plurality of fan blades and each of the plurality of counterweight levers in unison.

The gas turbine engine according to the preceding clause, wherein the fan assembly further comprises (e) a spinner fairing surrounding the counterweight system and extending circumferentially about the fan assembly centerline axis, wherein a radial extent of each of the plurality of counterweight levers is defined by a circumference about the fan assembly centerline axis having radial distance (R) extending orthogonally from the fan assembly centerline axis, the radial extent providing a clearance between an inner circumference of the spinner fairing and each of the plurality of counterweight levers, and for each one of the plurality of counterweight levers, the counterweight center-of-gravity is arranged at a length (L) extending perpendicularly from the respective counterweight lever rotational axis to the counterweight center-of-gravity and satisfies a relationship: $R<L>0.5*R$.

The gas turbine engine according to any preceding clause, wherein, for each counterweight lever, a height plane is defined extending along the fan assembly centerline axis and orthogonal to the respective counterweight lever rotational axis, the counterweight trunnion portion being arranged on a first side of the height plane, and the counterweight center-of-gravity is arranged at height (H) from the height plane on the first side of the height plane, wherein $H<0.5*R$.

The gas turbine engine according to any preceding clause, wherein the fan actuation system includes a blade-counterweight actuator assembly configured to be actuated in an axial direction along the fan assembly centerline axis, the blade-counterweight actuator assembly being connected to each of the plurality of fan blades and connected to each counterweight trunnion portion of the plurality of counterweight levers, such that axial movement of the blade-counterweight actuator assembly along the fan assembly centerline axis causes rotation of each fan blade about their respective fan blade pitch axis, and causes rotation of each counterweight lever about their respective counterweight lever rotational axis.

The gas turbine engine according to any preceding clause, wherein the blade-counterweight actuator assembly includes a weight-blade shaft assembly having a shaft that includes a fan blade engagement portion arranged to drive rotation of each of the plurality of fan blades about the respective blade pitch change axis, and a counterweight engagement portion arranged to drive rotation of each of the plurality of counterweight levers about the respective counterweight lever rotational axis.

The gas turbine engine according to any preceding clause, wherein the weight-blade shaft assembly further includes a hydraulic drive portion arranged to drive axial movement of the shaft in a forward direction along the fan assembly centerline axis and in an aft direction along the fan assembly centerline axis.

The gas turbine engine according to any preceding clause, wherein, in operation, the fan assembly is driven to rotate about the fan assembly centerline axis, and the blade-counterweight actuator assembly is actuated to change a pitch angle of each of the plurality of fan blades about their respective blade pitch change axis, and to rotate each of the plurality of counterweight levers about their respective counterweight lever rotational axis to axially shift a plane of rotation of each counterweight of about the fan assembly centerline axis, and a change of the pitch angle of each fan blade imparts a blade moment about the respective blade pitch change axis, which imparts a first axial load in a first axial direction with respect to the fan assembly centerline axis to the fan blade engagement portion of the weight-blade shaft assembly, and the rotation of each of the plurality of counterweight levers about their respective counterweight lever rotational axis imparts a counterweight moment about the respective counterweight lever rotational axis, which imparts a second axial load in a second axial direction opposite the first axial direction with respect to the fan assembly centerline axis to the counterweight engagement portion of the weight-blade shaft assembly.

The gas turbine engine according to any preceding clause, wherein a first rotational plane about the fan assembly centerline axis of the counterweight center-of-gravity of each counterweight lever is defined radially orthogonal to the fan assembly centerline axis, and, in a first rotational state of the counterweight system, each of the counterweight levers is rotationally positioned at a first rotational position about their respective counterweight lever rotational axis, such that the respective counterweight lever rotational axis and the counterweight center-of-gravity of the respective counterweight are arranged in the first rotational plane, the first rotational state defining a first axial position of the first rotational plane along a length of the fan assembly centerline axis.

The gas turbine engine according to any preceding clause, wherein, in the first rotational state, each counterweight lever is configured such that a portion of the second end of the counterweight lever overlaps circumferentially with a portion of the first end of a circumferentially spaced apart adjacent counterweight lever.

The gas turbine engine according to any preceding clause, wherein a second rotational plane about the fan assembly centerline axis of the counterweight center-of-gravity of each counterweight lever is defined radially orthogonal to the fan assembly centerline axis and is axially shifted in a first direction along the fan assembly centerline axis from the first axial position, and, in a second rotational state of the counterweight system, each of the counterweight levers is rotationally positioned at a second rotational position about their respective counterweight lever rotational axis such that the counterweight center-of-gravity of the respective counterweight is arranged in the second rotational plane, the second rotational state defining a second axial position of the second rotational plane along the length of the fan assembly centerline axis.

The gas turbine engine according to any preceding clause, wherein the second rotational position is rotated between eighty degrees and one hundred ten degrees about the respective counterweight lever rotational axis from the first rotational position.

The gas turbine engine according to any preceding clause, wherein the fan actuation system includes a blade-counterweight actuator assembly configured to be actuated in an axial direction along the fan assembly centerline axis, the blade-counterweight actuator assembly being connected to each of the plurality of fan blades and connected to each counterweight trunnion portion of the plurality of counterweight levers, such that axial movement of the blade-counterweight actuator assembly along the fan assembly centerline axis causes rotation of each fan blade about their respective fan blade pitch axis, and causes rotation of each counterweight lever about their respective counterweight lever rotational axis.

The gas turbine engine according to any preceding clause, wherein the blade-counterweight actuator assembly includes a weight-blade shaft assembly having a shaft that includes a fan blade engagement portion arranged to drive rotation of each of the plurality of fan blades about the respective blade pitch change axis, and a counterweight engagement portion arranged to drive rotation of each of the plurality of counterweight levers about the respective counterweight lever rotational axis.

The gas turbine engine according to any preceding clause, wherein the weight-blade shaft assembly further includes a hydraulic drive portion arranged to drive axial movement of the shaft in a forward direction along the fan assembly centerline axis and in an aft direction along the fan assembly centerline axis.

The gas turbine engine according to any preceding clause, wherein, in operation, the fan assembly is driven to rotate about the fan assembly centerline axis, and the blade-counterweight actuator assembly is actuated to change a pitch angle of each of the fan blades about their respective blade pitch change axis, and to rotate each of the plurality of counterweight levers about their respective counterweight lever rotational axis to axially shift a plane of rotation of each counterweight about the fan assembly centerline axis.

The gas turbine engine according to any preceding clause, wherein a change of the pitch angle of each fan blade imparts a blade moment about the respective blade pitch change axis, which imparts a first axial load in a first axial direction with respect to the fan assembly centerline axis to the fan blade engagement portion of the weight-blade shaft assembly, and the rotation of each of the plurality of counterweight levers about their respective counterweight lever rotational axis imparts a counterweight moment about the respective counterweight lever rotational axis, which imparts a second axial load in a second axial direction opposite the first axial direction with respect to the fan assembly centerline axis to the counterweight engagement portion of the weight-blade shaft assembly.

The gas turbine engine according to any preceding clause, wherein the first axial load in the first axial direction and the second axial load in the second axial direction impart a compression force to the weight-blade shaft assembly.

The gas turbine engine according to any preceding clause, wherein a number of the counterweight levers implemented in the counterweight system is the same as a number of the fan blades.

The gas turbine engine according to any preceding clause, wherein a number of the counterweight levers implemented in the counterweight system is different from a number of the fan blades.

The gas turbine engine according to any preceding clause, wherein the number of counterweight levers implemented in the counterweight system is less than the number of the fan blades.

The gas turbine engine according to any preceding clause, wherein a rotational angle range of rotation of each of the counterweight levers about the counterweight lever rotational axis is in a range from zero degrees to one hundred ten degrees.

The gas turbine engine according to any preceding clause, wherein the counterweight system is arranged axially forward of the fan blade hub, with respect to the fan assembly centerline axis.

The gas turbine engine according to any preceding clause, wherein, in a case when the fan blades are arranged in a feather position, each of the counterweight levers is arranged in a retracted position.

The gas turbine engine according to any preceding clause, wherein, in a case when the fan blades are rotated to increase a course angle of attack, each of the counterweight levers is rotated a corresponding amount about their respective counterweight lever rotational axis to shift the center-of-gravity of each counterweight axially forward, with respect to the fan assembly centerline axis.

The gas turbine engine according to any preceding clause, wherein each fan blade includes a fan blade crank arm arranged to drive rotation of the fan blade about the respective fan blade pitch change axis, and each counterweight lever includes a lever crank arm arranged to drive rotation of the counterweight lever about the respective counterweight lever rotational axis.

The gas turbine engine according to any preceding clause, wherein each fan blade crank arm is connected to a bearing member that is connected to a fan blade engagement portion of the shaft of the weight-blade shaft assembly, and each lever crank arm is connected to a bearing member that is connected to a counterweight engagement portion of the shaft of the weight-blade shaft assembly.

The gas turbine engine according to any preceding clause, wherein the fan blade crank arm is angularly offset from the fan blade pitch change axis, and the lever crank arm is angularly offset from the counterweight lever rotational axis.

The gas turbine engine according to any preceding clause, wherein each counterweight lever is additively manufactured.

The gas turbine engine according to any preceding clause, wherein each counterweight lever is one of a metallic structure, or a composite structure.

The gas turbine engine according to any preceding clause, wherein each counterweight lever has an I-beam type structure.

The gas turbine engine according to any preceding clause, wherein each counterweight lever has a tapered tubular-shaped structure.

The gas turbine engine according to any preceding clause, wherein each counterweight lever has a box-beam type structure.

A method of operating a gas turbine engine, the gas turbine engine comprising (1) a compressor section, (2) a combustor, (3) a turbine section, and (4) a fan assembly, the fan assembly defining a fan assembly centerline axis about which the fan assembly rotates when the fan assembly is driven by the turbine section, the fan assembly comprising (a) a fan actuation system comprising a blade-counterweight actuator assembly, (b) a fan blade hub, (c) a plurality of fan blades, each fan blade being rotationally connected to the fan blade hub and connected to the fan actuation system, the fan actuation system being arranged to rotate about a respective blade pitch change axis, and (d) a counterweight system arranged disconnected from the plurality of fan blades and being connected to the fan actuation system, the counterweight system including (i) a counterweight hub and (ii) a plurality of counterweight levers, each of the counterweight levers having (1) a counterweight trunnion portion rotationally connected to the counterweight hub and connected to the blade-counterweight actuator assembly that rotates each counterweight lever about a respective counterweight lever rotational axis extending through the counterweight trunnion portion and extending radially from the fan assembly centerline axis, (2) a cantilever arm having a first end connected to the counterweight trunnion portion and a second end offset from the respective counterweight lever rotational axis, and (3) a counterweight connected to the second end, the counterweight having a counterweight center-of-gravity, the method comprising operating the blade-counterweight actuator assembly, in unison, (A) to rotate the plurality of fan blades to be arranged in a first blade rotational position with respect to the fan blade pitch change axis, and, (B) to rotate the plurality of counterweight levers to be arranged in a first lever rotational position with respect to the counterweight lever rotational axis, operating the compressor section, the combustor, and the turbine section to cause the turbine section to rotate and to drive rotation of the fan assembly about the fan centerline axis, and operating the blade-counterweight actuator assembly, in unison, (C) to rotate the plurality of fan blades to be arranged in a second blade rotational position with respect to the fan blade pitch change axis, and (D) to rotate the plurality of counterweight levers to be arranged in a second lever rotational position with respect to the counterweight lever rotational axis, the second blade rotational position imparting a torque by each fan blade about the respective fan blade pitch change axis, and imparting a first blade axial force by each fan blade to the blade-counterweight actuator assembly, and, the second lever rotational position imparting a torque by each counterweight about the respective counterweight lever rotational axis, and imparting a first counterweight axial force by each counterweight lever to the blade-counterweight actuator assembly, the first counterweight axial force opposing the first blade axial force.

The method according to the preceding clause, wherein the first blade rotational position is a feather position, and the first counterweight rotational position is a retracted position of each counterweight lever.

The method according to any preceding clause, wherein the second blade rotational position is a course angle of attack increase of a blade pitch of each fan blade about the respective blade pitch change axis, and the second lever rotational position is a partially extended position in which each counterweight lever is rotated about the respective counterweight lever rotational axis to shift an axial location of each respective counterweight to shift an axial plane of rotation of each counterweight about the fan assembly centerline axis.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A fan assembly for a gas turbine engine, the fan assembly defining a fan assembly centerline axis, the fan assembly comprising:
   a fan actuation system comprising a blade-counterweight actuator assembly;
   a fan blade hub;
   a plurality of fan blades, each fan blade being rotationally connected to the fan blade hub and connected to the fan actuation system, the fan actuation system being arranged to rotate each fan blade about a respective blade pitch change axis; and
   a counterweight system arranged disconnected from the plurality of fan blades and being connected to the fan actuation system, the counterweight system including (a) a counterweight hub, and (b) a plurality of counterweight levers, each counterweight lever having (i) a counterweight trunnion portion rotationally connected to the counterweight hub and connected to the fan actuation system that rotates each counterweight lever about a respective counterweight lever rotational axis extending through the counterweight trunnion portion and extending radially from the fan assembly centerline axis, (ii) a cantilever arm having a first end connected to the counterweight trunnion portion and a second end offset from the respective counterweight lever rotational axis, and (iii) a counterweight connected to the second end, the counterweight having a counterweight center-of-gravity, wherein the fan actuation system is arranged to correspondingly rotate each of the plurality of fan blades and each of the plurality of counterweight levers in unison.

2. The fan assembly according to claim 1, further comprising a spinner fairing surrounding the counterweight system and extending circumferentially about the fan assembly centerline axis, wherein a radial extent of each of the plurality of counterweight levers is defined by a circumference about the fan assembly centerline axis having a radial distance (R) extending orthogonally from the fan assembly centerline axis, the radial extent providing a clearance between an inner circumference of the spinner fairing and each of the plurality of counterweight levers, and for each one of the plurality of counterweight levers, the counterweight center-of-gravity is arranged a length (L) extending perpendicularly from the respective counterweight lever rotational axis to the counterweight center-of-gravity and satisfies a relationship: R<L>0.5*R.

3. The fan assembly according to claim 1, wherein, for each counterweight lever, a height plane is defined extending along the fan assembly centerline axis and orthogonal to the respective counterweight lever rotational axis, the counterweight trunnion portion being arranged on a first side of the height plane, and the counterweight center-of-gravity is arranged at a height (H) from the height plane on the first side of the height plane, wherein H<0.5*R.

4. The fan assembly according to claim 1, wherein a first rotational plane about the fan assembly centerline axis of the counterweight center-of-gravity of each counterweight lever is defined radially orthogonal to the fan assembly centerline axis, and, in a first rotational state of the counterweight system, each of the counterweight levers is rotationally positioned at a first rotational position about their respective counterweight lever rotational axis, such that the respective counterweight lever rotational axis and the counterweight center-of-gravity of the respective counterweight are arranged in the first rotational plane, the first rotational state defining a first axial position of the first rotational plane along a length of the fan assembly centerline axis.

5. The fan assembly according to claim 4, wherein, in the first rotational state, each counterweight lever is configured such that a portion of the second end of the counterweight lever overlaps circumferentially with a portion of the first end of a circumferentially spaced apart adjacent counterweight lever.

6. The fan assembly according to claim 4, wherein a second rotational plane about the fan assembly centerline axis of the counterweight center-of-gravity of each counterweight lever is defined radially orthogonal to the fan assembly centerline axis and is axially shifted in a first direction along the fan assembly centerline axis from the first axial position, and, in a second rotational state of the counterweight system, each of the counterweight levers is rotationally positioned at a second rotational position about their respective counterweight lever rotational axis such that the counterweight center-of-gravity of the respective counterweight is arranged in the second rotational plane, the second rotational state defining a second axial position of the second rotational plane along the length of the fan assembly centerline axis.

7. The fan assembly according to claim 6, wherein the second rotational position is rotated between eighty degrees and one hundred ten degrees about the respective counterweight lever rotational axis from the first rotational position.

8. The fan assembly according to claim 1, wherein the blade-counterweight actuator assembly is configured to be actuated in an axial direction along the fan assembly centerline axis, the blade-counterweight actuator assembly being connected to each of the plurality of fan blades and connected to each counterweight trunnion portion of the plurality of counterweight levers, such that axial movement of the blade-counterweight actuator assembly along the fan assembly centerline axis causes rotation of each fan blade about their respective fan blade pitch axis, and causes rotation of each counterweight lever about their respective counterweight lever rotational axis.

9. The fan assembly according to claim 8, wherein the blade-counterweight actuator assembly includes a weight-blade shaft assembly having a shaft that includes a fan blade engagement portion arranged to drive rotation of each of the plurality of fan blades about the respective blade pitch change axis, and a counterweight engagement portion arranged to drive rotation of each of the plurality of counterweight levers about the respective counterweight lever rotational axis.

10. The fan assembly according to claim 9, wherein the weight-blade shaft assembly further includes a hydraulic drive portion arranged to drive axial movement of the shaft in a forward direction along the fan assembly centerline axis and in an aft direction along the fan assembly centerline axis.

11. The fan assembly according to claim 10, wherein, in operation, the fan assembly is driven to rotate about the fan assembly centerline axis, and the blade-counterweight actuator assembly is actuated to change a pitch angle of each of the plurality of fan blades about their respective blade pitch change axis, and to rotate each of the plurality of counterweight levers about their respective counterweight lever rotational axis to axially shift a plane of rotation of each counterweight about the fan assembly centerline axis.

12. The fan assembly according to claim 11, wherein a change of the pitch angle of each fan blade imparts a blade moment about the respective blade pitch change axis, which imparts a first axial load in a first axial direction with respect to the fan assembly centerline axis to the fan blade engagement portion of the weight-blade shaft assembly, and the rotation of each of the plurality of counterweight levers about their respective counterweight lever rotational axis imparts a counterweight moment about the respective counterweight lever rotational axis, which imparts a second axial load in a second axial direction opposite the first axial direction with respect to the fan assembly centerline axis to the counterweight engagement portion of the weight-blade shaft assembly.

13. The fan assembly according to claim 12, wherein the first axial load in the first axial direction and the second axial load in the second axial direction impart a compression force to the weight-blade shaft assembly.

14. A gas turbine engine comprising:
a compressor section;
a combustor;
a turbine section; and
a fan assembly, the fan assembly defining a fan assembly centerline axis, the fan assembly comprising (a) a fan actuation system, (b) a fan blade hub, (c) a plurality of fan blades, each fan blade being rotationally connected to the fan blade hub and connected to the fan actuation system, the fan actuation system being arranged to rotate about a respective blade pitch change axis, and (d) a counterweight system arranged disconnected from the plurality of fan blades and being connected to the fan actuation system, the counterweight system including (i) a counterweight hub and (ii) a plurality of counterweight levers, each of the counterweight levers having (1) a counterweight trunnion portion rotationally connected to the counterweight hub and connected to the fan actuation system that rotates each counterweight lever about a respective counterweight lever rotational axis extending through the counterweight trunnion portion and extending radially from the fan assembly centerline axis, (2) a cantilever arm having a first end connected to the counterweight trunnion portion and a second end offset from the respective counterweight lever rotational axis, and (3) a counterweight connected to the second end, the counterweight having a counterweight center-of-gravity,
wherein the fan actuation system is arranged to correspondingly rotate each of the plurality of fan blades and each of the plurality of counterweight levers in unison.

15. The gas turbine engine according to claim 14, wherein the fan assembly further comprises (e) a spinner fairing surrounding the counterweight system and extending circumferentially about the fan assembly centerline axis,
wherein a radial extent of each of the plurality of counterweight levers is defined by a circumference about the fan assembly centerline axis having radial distance (R) extending orthogonally from the fan assembly centerline axis, the radial extent providing a clearance between an inner circumference of the spinner fairing and each of the plurality of counterweight levers, and for each one of the plurality of counterweight levers, the counterweight center-of-gravity is arranged at a length (L) extending perpendicularly from the respective counterweight lever rotational axis to the counterweight center-of-gravity and satisfies a relationship: R<L>0.5*R.

16. The gas turbine engine according to claim 15, wherein, for each counterweight lever, a height plane is defined extending along the fan assembly centerline axis and orthogonal to the respective counterweight lever rotational axis, the counterweight trunnion portion being arranged on a first side of the height plane, and the counterweight center-of-gravity is arranged at height (H) from the height plane on the first side of the height plane, wherein H<0.5*R.

17. The gas turbine engine according to claim 15, wherein the fan actuation system includes a blade-counterweight actuator assembly configured to be actuated in an axial direction along the fan assembly centerline axis, the blade-counterweight actuator assembly being connected to each of the plurality of fan blades and connected to each counterweight trunnion portion of the plurality of counterweight levers, such that axial movement of the blade-counterweight actuator assembly along the fan assembly centerline axis causes rotation of each fan blade about their respective fan blade pitch axis, and causes rotation of each counterweight lever about their respective counterweight lever rotational axis.

18. The gas turbine engine according to claim 17, wherein the blade-counterweight actuator assembly includes a weight-blade shaft assembly having a shaft that includes a fan blade engagement portion arranged to drive rotation of each of the plurality of fan blades about the respective blade pitch change axis, and a counterweight engagement portion arranged to drive rotation of each of the plurality of counterweight levers about the respective counterweight lever rotational axis.

19. The gas turbine engine according to claim 18, wherein the weight-blade shaft assembly further includes a hydraulic drive portion arranged to drive axial movement of the shaft in a forward direction along the fan assembly centerline axis and in an aft direction along the fan assembly centerline axis.

20. A method of operating a gas turbine engine, the gas turbine engine comprising (1) a compressor section, (2) a combustor, (3) a turbine section, and (4) a fan assembly, the fan assembly defining a fan assembly centerline axis about which the fan assembly rotates when the fan assembly is driven by the turbine section, the fan assembly comprising (a) a fan actuation system comprising a blade-counterweight actuator assembly, (b) a fan blade hub, (c) a plurality of fan blades, each fan blade being rotationally connected to the fan blade hub and connected to the fan actuation system, the fan actuation system being arranged to rotate about a respective blade pitch change axis, and (d) a counterweight system arranged disconnected from the plurality of fan blades and being connected to the fan actuation system, the counterweight system including (i) a counterweight hub and (ii) a plurality of counterweight levers, each of the counterweight levers having (1) a counterweight trunnion portion rotationally connected to the counterweight hub and connected to the blade-counterweight actuator assembly that rotates each counterweight lever about a respective counterweight lever rotational axis extending through the counterweight trunnion portion and extending radially from the fan assembly centerline axis, (2) a cantilever arm having a first end connected to the counterweight trunnion portion and a second end offset from the respective counterweight lever rotational axis, and (3) a counterweight connected to the second end, the counterweight having a counterweight center-of-gravity, the method comprising:
operating the blade-counterweight actuator assembly, in unison, (A) to rotate the plurality of fan blades to be arranged in a first blade rotational position with respect to the respective blade pitch change axis, and, (B) to rotate the plurality of counterweight levers to be arranged in a first lever rotational position with respect to the respective counterweight lever rotational axis;
operating the compressor section, the combustor, and the turbine section to cause the turbine section to rotate and to drive rotation of the fan assembly about the fan assembly centerline axis; and
operating the blade-counterweight actuator assembly, in unison, (C) to rotate the plurality of fan blades to be arranged in a second blade rotational position with respect to the blade pitch change axis, and (D) to rotate the plurality of counterweight levers to be arranged in a second lever rotational position with respect to the respective counterweight lever rotational axis, the second blade rotational position imparting a torque by each fan blade about the respective blade pitch change axis, and imparting a first blade axial force by each fan blade to the blade-counterweight actuator assembly, and, the second lever rotational position imparting a torque by each counterweight about the respective counterweight lever rotational axis, and imparting a first counterweight axial force by each counterweight lever to the blade-counterweight actuator assembly, the first counterweight axial force opposing the first blade axial force.

* * * * *